US009236717B2

(12) United States Patent
Bravo et al.

(10) Patent No.: US 9,236,717 B2
(45) Date of Patent: Jan. 12, 2016

(54) EQUIPMENT SEGREGATION UNIT FOR AN INDUSTRIAL CONTROL PANEL

(71) Applicant: Panduit Corp., Tinley Park, IL (US)

(72) Inventors: Rey Bravo, Manhattan, IL (US); Brian K. Arflack, Burr Ridge, IL (US); Frank E. Grzelak, Jr., Darien, IL (US); Eleobardo Moreno, St. John, IN (US); Brian K. Rohder, Plainfield, IL (US)

(73) Assignee: Panduit Corp., Tinley Park, IL (US)

( * ) Notice: Subject to any disclaimer, the term of this patent is extended or adjusted under 35 U.S.C. 154(b) by 294 days.

(21) Appl. No.: 13/710,947

(22) Filed: Dec. 11, 2012

(65) Prior Publication Data

US 2014/0159552 A1 Jun. 12, 2014

(51) Int. Cl.
*H02B 1/30* (2006.01)
*H02G 3/08* (2006.01)

(52) U.S. Cl.
CPC .............. *H02B 1/308* (2013.01); *H02G 3/086* (2013.01)

(58) Field of Classification Search
CPC ......... H02G 3/08; H02G 3/086; H02G 3/088; H05K 5/0004; H05K 5/0217; H05K 5/0247; H02B 1/308
See application file for complete search history.

(56) References Cited

U.S. PATENT DOCUMENTS

| | | | |
|---|---|---|---|
| 5,082,336 A | 1/1992 | Munch et al. | |
| 5,216,579 A * | 6/1993 | Basara et al. | 361/679.46 |
| 5,801,921 A * | 9/1998 | Miller | 361/679.32 |
| 6,307,750 B1 * | 10/2001 | Bendikas et al. | 361/725 |
| 6,316,728 B1 * | 11/2001 | Hoover et al. | 174/651 |
| 6,330,152 B1 * | 12/2001 | Vos et al. | 361/688 |
| 6,469,901 B1 * | 10/2002 | Costner | 361/730 |
| 6,769,551 B2 * | 8/2004 | Rafferty et al. | 211/26 |
| 6,788,535 B2 * | 9/2004 | Dodgen et al. | 361/695 |
| 6,797,883 B2 | 9/2004 | Benson et al. | |
| 6,909,611 B2 * | 6/2005 | Smith et al. | 361/727 |
| 6,932,446 B2 * | 8/2005 | Hales | H05K 7/186 312/198 |
| 7,043,647 B2 * | 5/2006 | Hansen et al. | 713/320 |
| 7,116,558 B2 * | 10/2006 | Sugihara | 361/724 |
| 7,182,208 B2 * | 2/2007 | Tachibana | 211/26 |
| 7,276,659 B2 | 10/2007 | Thrift et al. | |
| 7,280,366 B1 * | 10/2007 | Hendrix et al. | 361/724 |
| 7,724,507 B2 | 5/2010 | Whitt et al. | |
| 8,003,899 B2 | 8/2011 | WenLong et al. | |
| 2005/0133238 A1 * | 6/2005 | Miller et al. | 174/52.1 |

(Continued)

FOREIGN PATENT DOCUMENTS

| | | |
|---|---|---|
| EP | 2139086 A1 | 12/2009 |
| EP | 2426945 A1 | 3/2012 |
| WO | 2011161319 A1 | 12/2011 |

*Primary Examiner* — Adrian S Wilson
(74) *Attorney, Agent, or Firm* — Christopher S. Clancy; James H. Williams

(57) ABSTRACT

An industrial control panel is provided that comprises a zone enclosure unit and an equipment segregation unit. The zone enclosure unit has a back panel, a plurality of side panels, a top panel, a bottom panel, and a door to access the interior of the zone enclosure unit. The zone enclosure unit is adapted to contain a first set of electrical equipment. The equipment segregation unit may be mounted to the zone enclosure unit. The equipment segregation unit has a back panel, a plurality of side panels, a bottom panel, and a door to access the interior of the equipment segregation unit. The equipment segregation unit is adapted to contain a second set of electrical equipment. The first set of electrical equipment is capable of being electrically connected to the second set of electrical equipment.

15 Claims, 26 Drawing Sheets

(56) References Cited

U.S. PATENT DOCUMENTS

| | | |
|---|---|---|
| 2008/0289873 A1 | 11/2008 | Herring et al. |
| 2009/0097200 A1* | 4/2009 | Sharma et al. ................ 361/688 |
| 2010/0265645 A1* | 10/2010 | Wang et al. ................ 361/679.4 |
| 2012/0125681 A1 | 5/2012 | Tang et al. |

* cited by examiner

EQUIPMENT SEGREGATION UNIT FOR AN INDUSTRIAL CONTROL PANEL

TECHNICAL FIELD

The present disclosure relates to an equipment segregation unit for an industrial control panel. More particularly, the disclosure relates to an equipment segregation unit that may mount to a surface of a zone enclosure unit in order to separate the contents of the equipment segregation unit from the contents of the zone enclosure unit.

BACKGROUND

Many industrial control panels contain a variety of types of electrical equipment that may have different requirements for achieving an optimal operating environment. For example, various types of electrical equipment operate at different power levels, have different electromagnetic interference issues, and may have varying thermal and ventilation requirements.

For example, an industrial control panel may have a primary input power circuit entering the panel below 600 volts, while other equipment within the industrial control panel may operate on a secondary circuit with limited current at a lower voltage, such as a voltage below 42.4 volts (peak). Generally, because an industrial control panel may contain potentially-hazardous energy levels (voltage, current and exposure time), an authoritative body such as the National Fire Protection Association, Underwriters Laboratories, the International Electrotechnical Commission, local authorities having jurisdiction, or other regulations specify that only a qualified person, such as a licensed electrician, have access to the inside of the control panel. However, often times a person other than a licensed electrician is able to safely work on components operating on a SELV circuit (Safety Extra Low Voltage) that is a current-limited secondary circuit at a voltage below 42.2 volts (peak), such as an information technology (IT) professional. An IT professional may be sufficiently qualified to service, replace, and/or install components operating on a SELV circuit (Safety Extra Low Voltage) that is current-limited secondary circuits at a voltage below 42.2 volts (peak), however, the above mentioned authorities discourage or prohibit such behavior in a typical industrial control panel.

Further, some equipment that is within an industrial control panel may be susceptible to electromagnetic interference caused by being located proximate other components within the industrial control panel, whereas other equipment may not be susceptible to electromagnetic interference. In addition, equipment such as a battery generally requires ventilation to minimize the risk of gas build-up within the industrial control panel. However, venting the industrial control panel may expose the electrical equipment contained within the industrial control panel to environmental conditions, such as water or other contaminates that may disrupt the operation of the electrical equipment. In addition, certain electrical equipment may generate a level of heat that may disrupt the operation of other electrical equipment within the industrial control panel. Therefore, a need exists for an industrial control panel capable of segregating various types of electrical equipment.

SUMMARY

An industrial control panel is provided that comprises a zone enclosure unit and an equipment segregation unit. The zone enclosure unit has a back panel, a plurality of side panels, a top panel, a bottom panel, and a door to access the interior of the zone enclosure unit. The zone enclosure unit is adapted to contain a first set of electrical equipment. The equipment segregation unit may mount to the zone enclosure unit. The equipment segregation unit has a back panel, a plurality of side panels, a bottom panel, and a door to access the interior of the equipment segregation unit. The equipment segregation unit is adapted to contain a second set of electrical equipment. The first set of electrical equipment is capable of being electrically connected to the second set of electrical equipment.

An embodiment of the present invention includes a system to segregate a first set of electrical equipment from a second set of electrical equipment. The system comprises an equipment segregation unit, a first set of electrical equipment and a second set of electrical equipment. The equipment segregation unit has a back panel, a plurality of side panels, a bottom panel, and a door to access the interior of the equipment segregation unit. The equipment segregation unit contains the first set of electrical equipment. The second set of electrical equipment is housed external to the equipment segregation unit. The first set of electrical equipment is electrically connected with the second set of electrical equipment. The equipment segregation unit includes a vapor resistant barrier to isolate the first set of electrical equipment from the second set of electrical equipment.

An embodiment of the present invention includes an industrial control panel that comprises a zone enclosure unit, an equipment segregation unit and a vapor barrier. The zone enclosure unit has a back panel, a plurality of side panels, a top panel, a bottom panel, and a door to access an interior region of the zone enclosure unit. The zone enclosure unit is adapted to contain a first set of electrical equipment. The equipment segregation unit has a back panel, a plurality of side panels, a bottom panel, and a door to access an interior portion of the equipment segregation unit. The equipment segregation unit is mounted to an outer surface of a panel of the zone enclosure unit. The equipment segregation unit is adapted to contain a second set of electrical equipment. The second set of electrical equipment includes at least one of a battery and a universal power supply. A vapor barrier separates the interior region of the zone enclosure unit from the interior portion of the equipment segregation unit. The first set of electrical equipment is adapted to receive power from the second set of electrical equipment.

DETAILED DESCRIPTION

FIGS. 1-27 illustrate various embodiments of an industrial control panel assembly in accordance with the present invention. An industrial control panel assembly is also referred to as an industrial automation zone enclosure. Examples of industrial automation zone enclosures are Panduit IAZ2436 or IAZ2436C automation zone enclosure, available from Panduit Corp. of Tinley Park, Ill.

Figure 1:
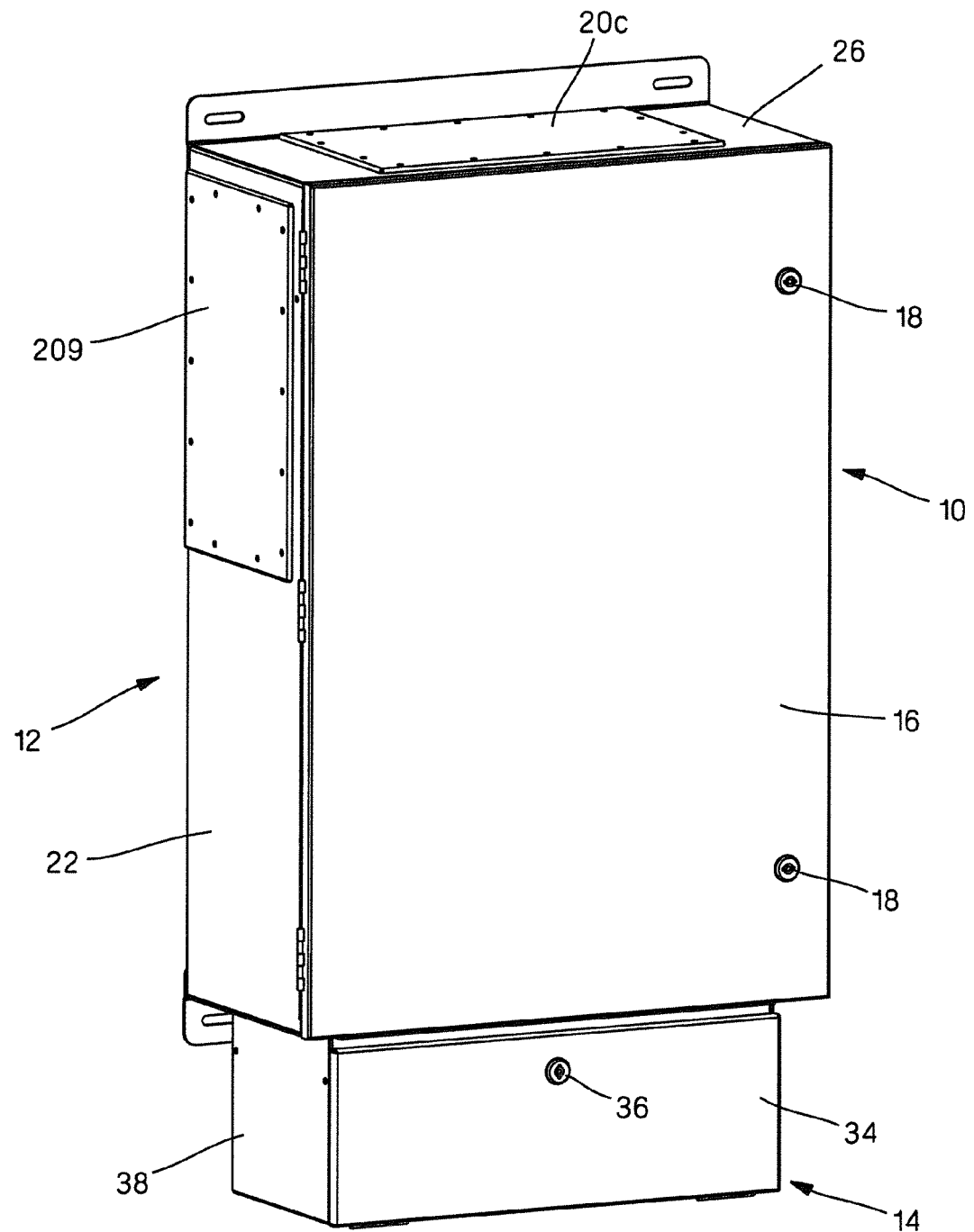
FIG. 1 is a perspective view of an industrial control panel according to an embodiment of the present invention.

FIGS. 1-13 illustrate a first embodiment of the present invention. FIG. 1 shows a perspective view of an industrial control panel assembly 10. The industrial control panel assembly 10 comprises a zone enclosure unit 12 and an equipment segregation unit 14 where the equipment segregation unit 14 is mounted to an outer surface of the zone enclosure unit 12.

Figure 2:
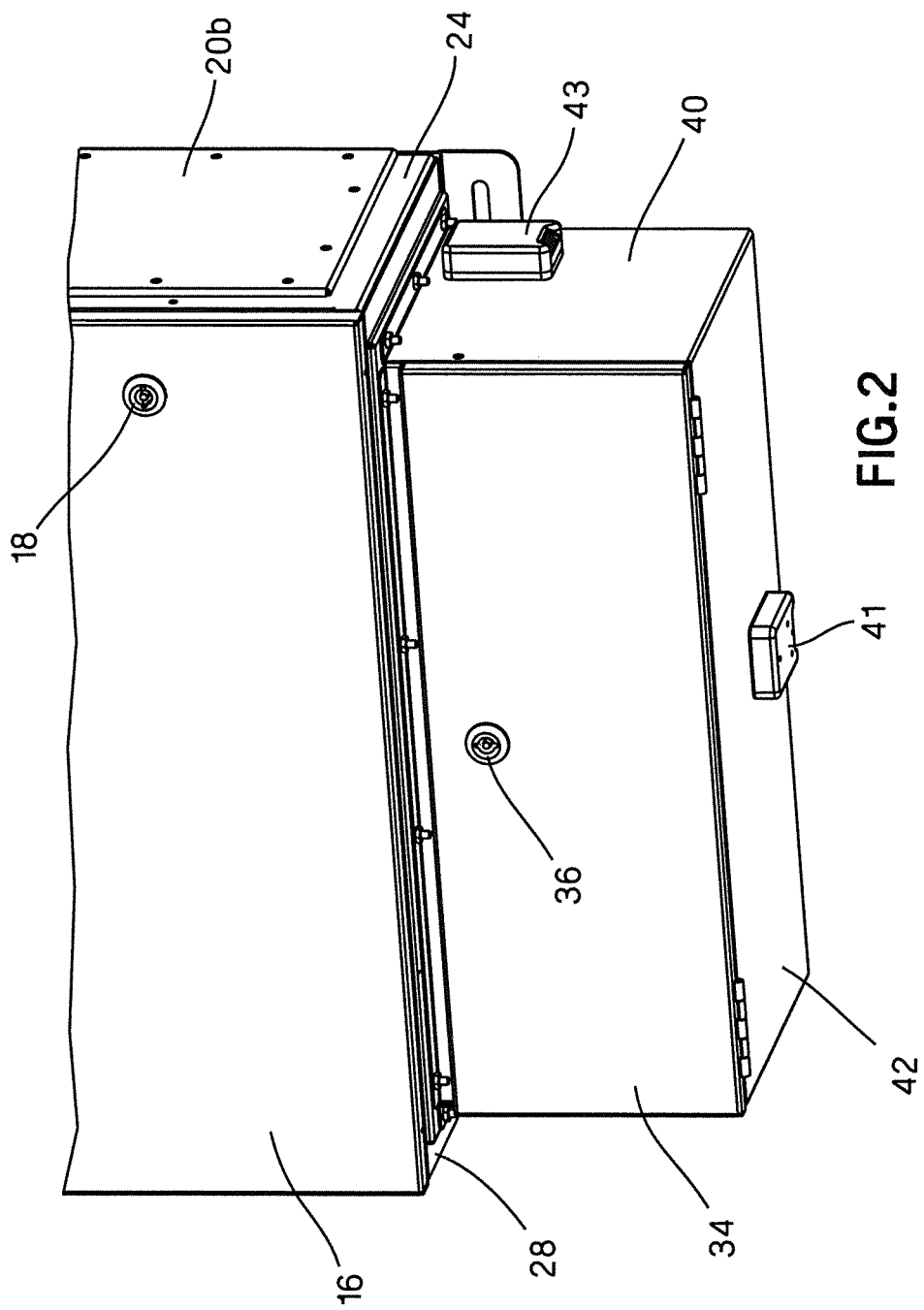
FIG. 2 is a detailed perspective view of a portion of the industrial control panel of FIG. 1.
Figure 3:
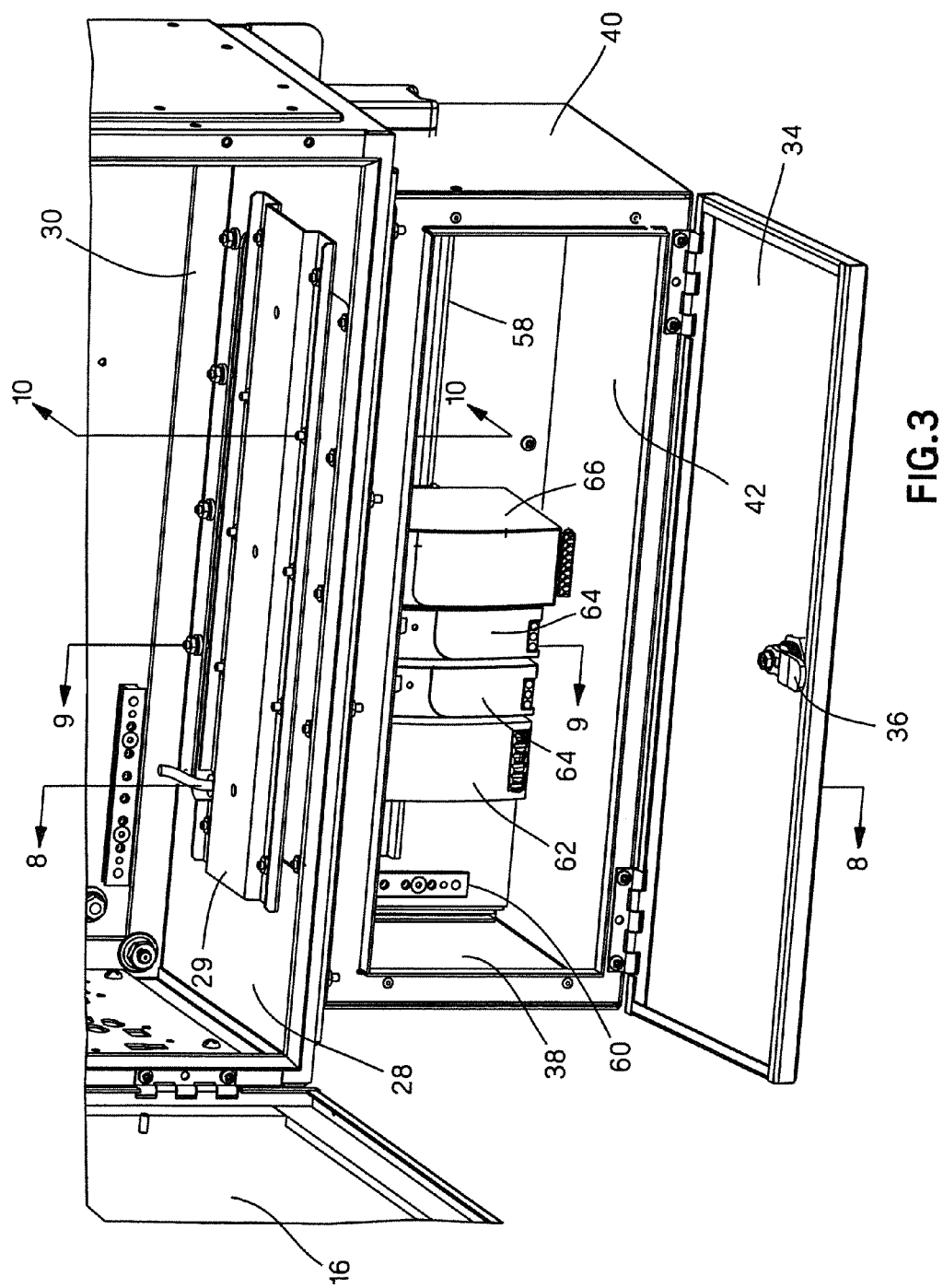
FIG. 3 is a detailed perspective view of a portion of the industrial control panel of FIG. 1 with front panels in an open position.
Figure 4:
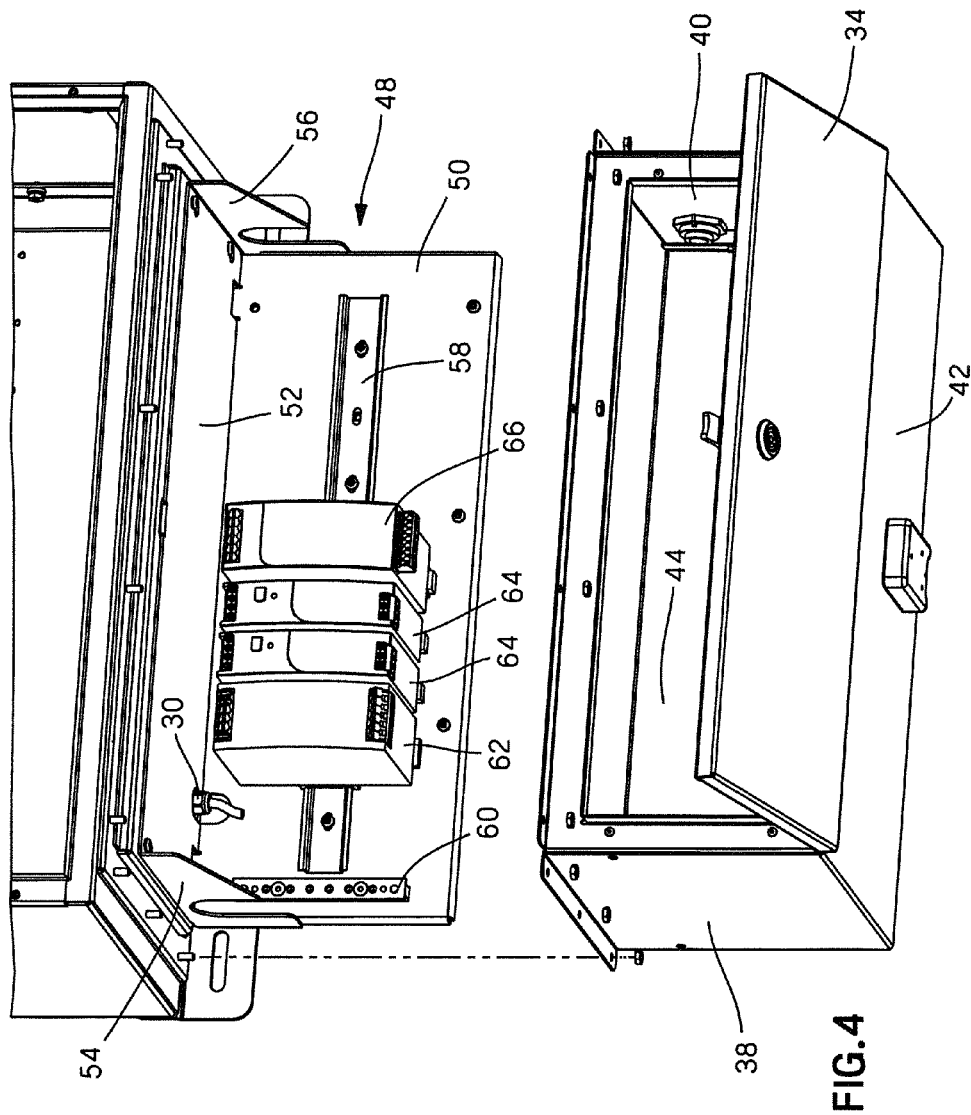
FIG. 4 is a partially exploded detailed perspective view of a portion of the industrial control panel of FIG. 1 with a front panel in an open position.

As shown in FIGS. 1-3, the zone enclosure unit 12 includes a left side panel 22, a right side panel 24, a top panel 26, a bottom panel 28, a back panel 30, and a door 16. The door 16 may be connected to the zone enclosure unit 12 by a hinge and moveable between a closed position (FIGS. 1 and 2) and an open position (FIG. 3). The door 16 may be secured in the closed position by one or more locks 18. The locks 18 on the door 16 of the zone enclosure 12 may be operated by a single key or may require multiple keys, depending on the level of security access required for the zone enclosure unit 12.

Figure 5:
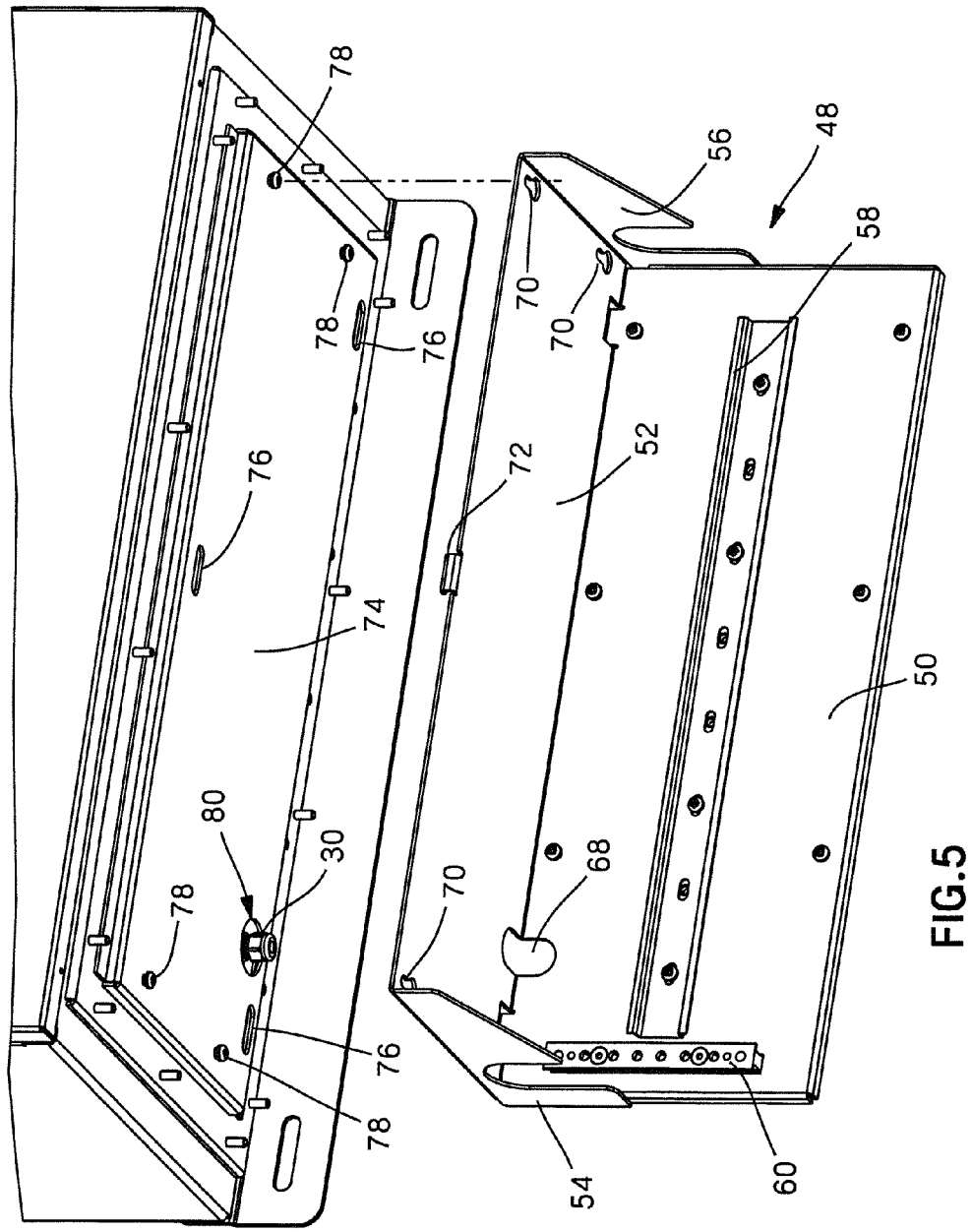
FIG. 5 is a perspective view of a portion of an equipment segregation unit of the industrial control panel of FIG. 1.

A plurality of removable gland plates 20a-20d may be provided on the panels of the zone enclosure unit 12 to provide access to the interior of the zone enclosure unit. For instance, the left side panel 22 of the zone enclosure unit 12 may contain a first gland plate 20a, while the right side panel 24 of the zone enclosure unit 12 may contain a second gland plate 20b (FIG. 2). Additionally, the top panel 26 of the zone enclosure unit 12 may contain a third gland plate 20c, while the bottom panel 28 of the zone enclosure unit 12 may contain a fourth gland plate 20d (FIG. 5).

Figure 6:
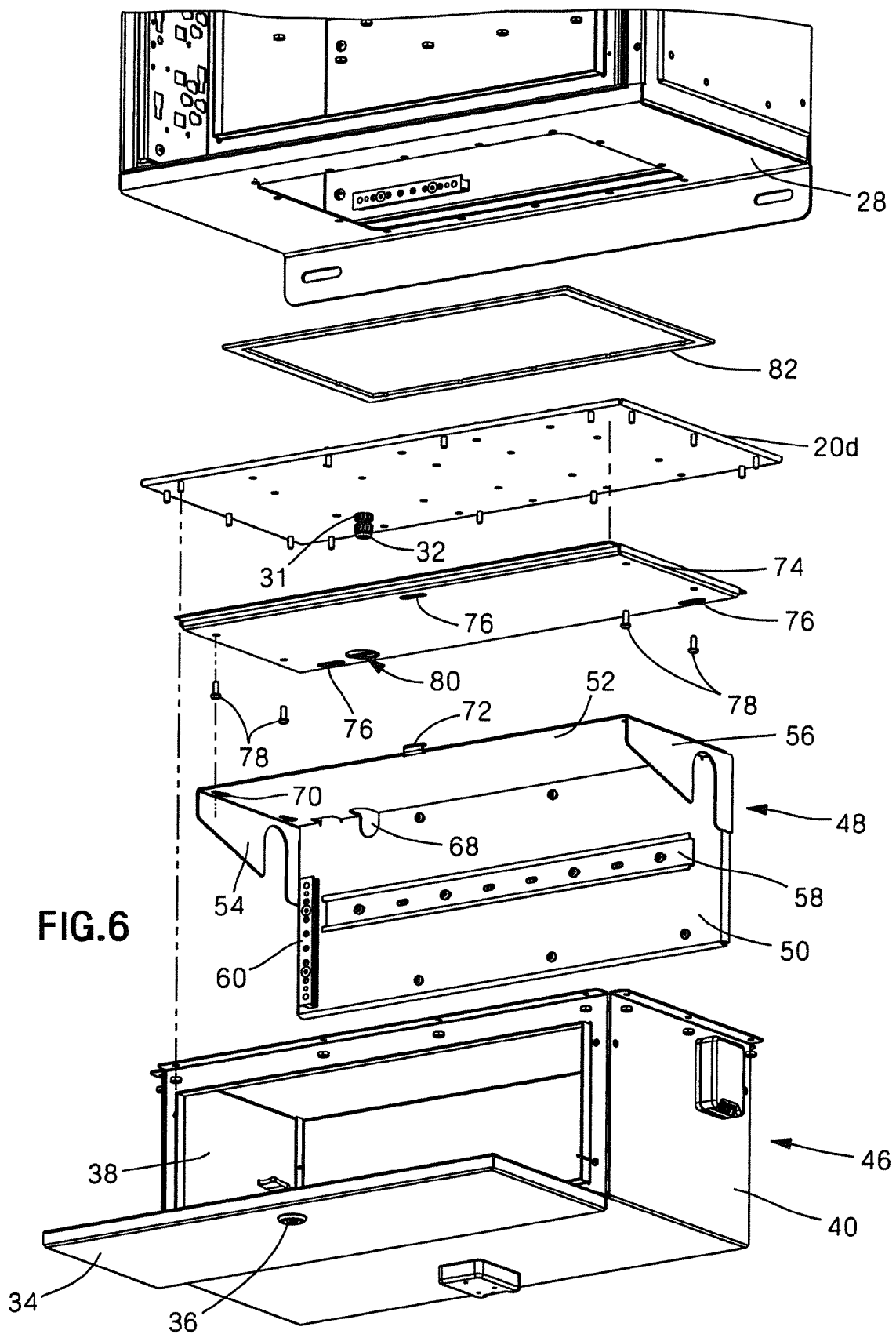
FIG. 6 is an exploded view of the equipment segregation unit of FIG. 1.
Figure 7:
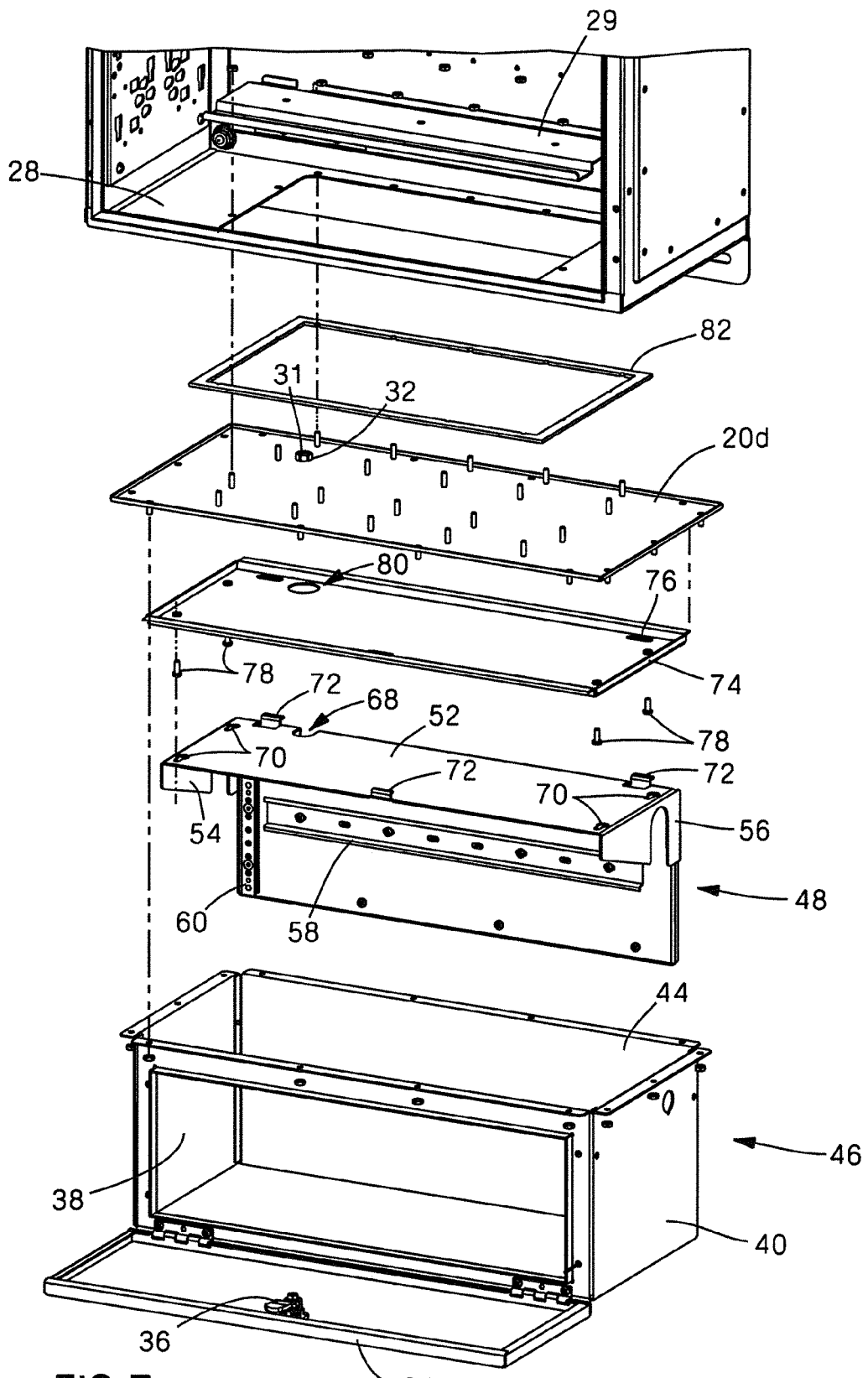
FIG. 7 is another exploded view of the equipment segregation unit of FIG. 1.

As shown best in FIGS. 6-7, the fourth gland plate 20d may have an opening 31 formed therein. The opening 31 allows access through the fourth gland plate 20d. For example, a gland fitting 32 may be placed within the opening 31 to allow electrical wiring to pass through the opening 31 of the fourth gland plate 20d and into the interior of the zone enclosure unit 12. The gland fitting 32 may be a water-tight fitting so that water and other liquids are restricted from entering the interior of the zone enclosure unit 12 through the opening 31 of the fourth gland plate 20d. The removable gland plates 20a-20d may be secured to the zone enclosure unit 12 in a variety of manners, such as via fasteners like bolts, screws, rivets, and the like, or via other known fastening techniques.

As shown in FIG. 7, a hat channel bracket 29 may be provided within the zone enclosure unit 12 and attached to the bottom panel 28. The hat channel bracket 29 distributes weight of the equipment segregation unit 14 over the bottom panel 28 of the zone enclosure unit 12.

The equipment segregation unit 14 comprises a left side panel 38, a right side panel 40, a bottom panel 42, a back panel 44 and a door 34. The door 34, left side panel 38, right side panel 40, bottom panel 42, and back panel 44 form an external cover assembly 46 (FIG. 6) for the equipment segregation unit 14. FIG. 2 illustrates an embodiment where a vent 43 is attached to the right side panel 40 and a drain 41 is attached to the bottom panel 42. The vent 43 may allow for gasses to pass from the equipment segregation unit 14, and may also allow for better cooling of the contents of the equipment segregation unit 14. The vent 43 may be of a type to minimize the chances of fluids from penetrating the equipment segregation unit 14. Should fluids penetrate the equipment segregation unit 14, the drain 41 allows the fluids to drain from the equipment segregation unit 14. The configuration provided in FIG. 2 is an example, and various types of vents and positions of the vents and drains may be used with the equipment segregation unit 14.

The equipment segregation unit 14 may have a door 34 moveable between a closed position (FIG. 1) and an open position (FIG. 3). The door 34 may be secured in the closed position by a lock 36. The lock 36 on the door 34 of the equipment segregation unit 14 may be operated by a key, or may be operated by other known locking systems such as a combination, biometric information, or any other known locking system.

As best shown in FIGS. 4-7, the equipment segregation unit 14 further comprises an equipment mounting bracket 48. The equipment mounting bracket 48 has a back panel 50, a top panel 52, a left panel 54 and a right panel 56. It is contemplated that the top panel 52 may be welded to the back panel 50. It is further contemplated that the left panel 54 and the right panel 56 may be welded to both the back panel 50 and the top panel 52. Welding the panels together may enhance the strength of the equipment mounting bracket 48. The equipment mounting bracket 48 further has a DIN rail 58 and a ground bar 60 attached thereto to allow for the connection of electrical equipment. As may be observed in FIGS. 3 and 4, a variety of electrical equipment may be installed on the DIN rail 58. An example of the electrical equipment that may be installed on the DIN rail 58 may include a surge protector or filter 62, a power supply 64, a DC Universal Power Supply 66, circuit breakers (not shown), interface modules (not shown), or any other known electrical equipment.

As shown in FIG. 5, the equipment mounting bracket 48 may have an opening 68 formed within the back panel 50 and the top panel 52 to allow electrical wiring to pass from the equipment segregation unit 14 to the zone enclosure unit 12. As shown in FIG. 7, a plurality of mounting keyholes 70 and flange hooks 72 may also be formed in the top panel 52 of the equipment mounting bracket 48. The mounting keyholes 70 and the flange hooks 72 assist in mounting the equipment mounting bracket 48 to an equipment standoff bracket 74.

As shown in FIG. 7, the equipment standoff bracket 74 attaches to the bottom gland plate 20d of the zone enclosure unit 12. A plurality of slots 76 (FIG. 6) are formed through the equipment standoff bracket 74. The slots 76 of the equipment standoff bracket are intended to receive the flange hooks 72 of the equipment mounting bracket 48. The equipment standoff bracket 74 provides a space between the bottom gland plate 20d to receive a plurality of fasteners 78. The fasteners 78, such as screws, bolts, and the like, are adapted to secure the equipment mounting bracket 48 to the equipment standoff bracket 48 via the mounting keyholes 70 of the equipment standoff bracket 48. An opening 80 is further provided in the equipment standoff bracket 74 to allow the gland fitting 32 to pass through. The equipment standoff bracket 74 may be attached to the bottom gland plate 20d via a plurality of fasteners, such as bolts, screws, or rivets, or the equipment standoff bracket 74 may be welded to the bottom gland plate 20d.

As shown best in FIG. 7, a gasket 82 may be disposed between the bottom gland plate 20d and the bottom panel 28 of the zone enclosure unit 12. The gasket 82 is provided proximate the perimeter of the bottom gland plate 20d. The gasket 82 forms a seal, for example, a water, gas, particulate, contaminate, vapor, dust, or moisture resistant barrier that separates the interior of the zone enclosure unit 12 from the interior of the equipment segregation unit 14.

Figure 8:
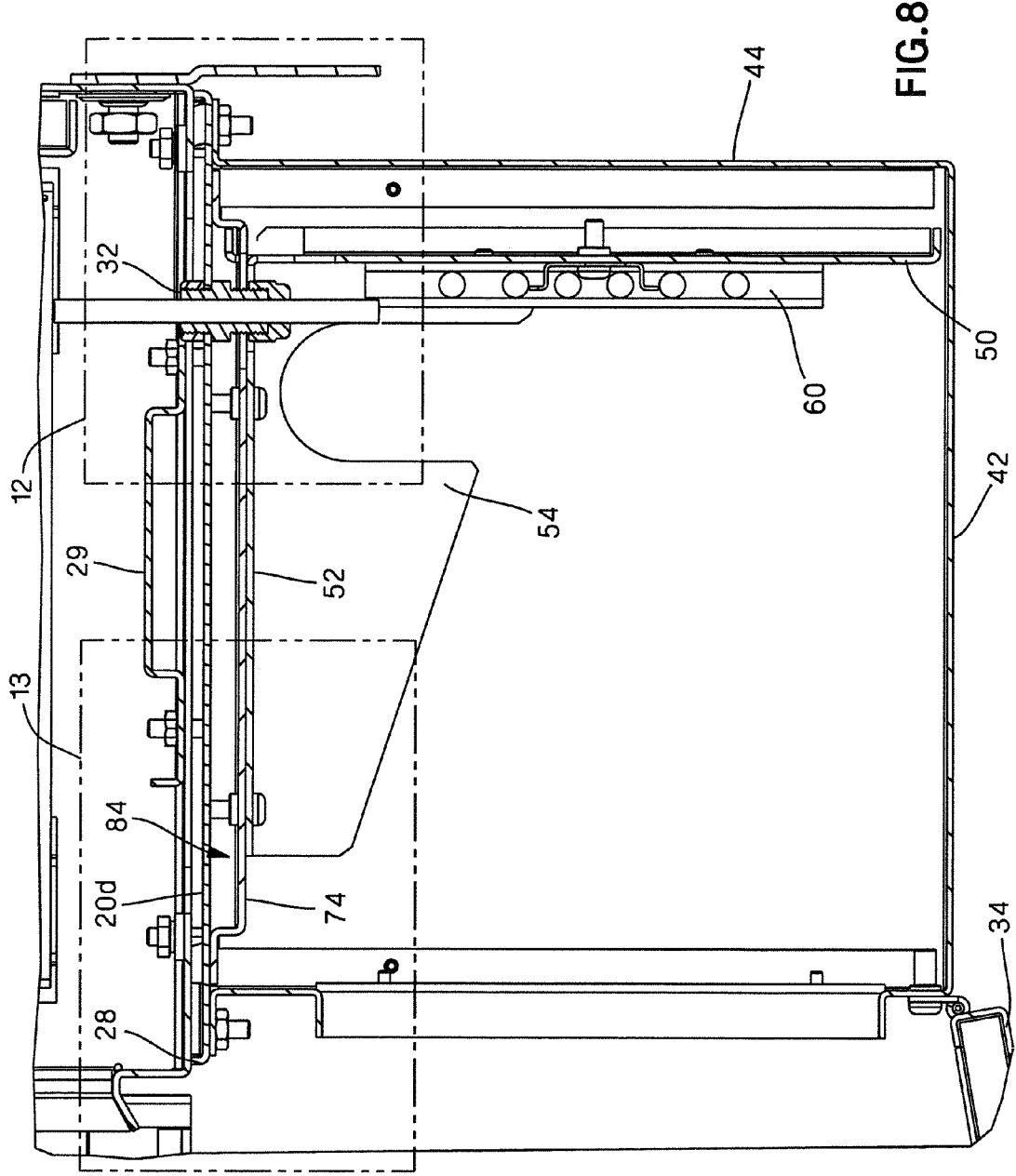
FIG. 8 is a sectional view taken through line 8-8 of FIG. 3.
Figure 9:
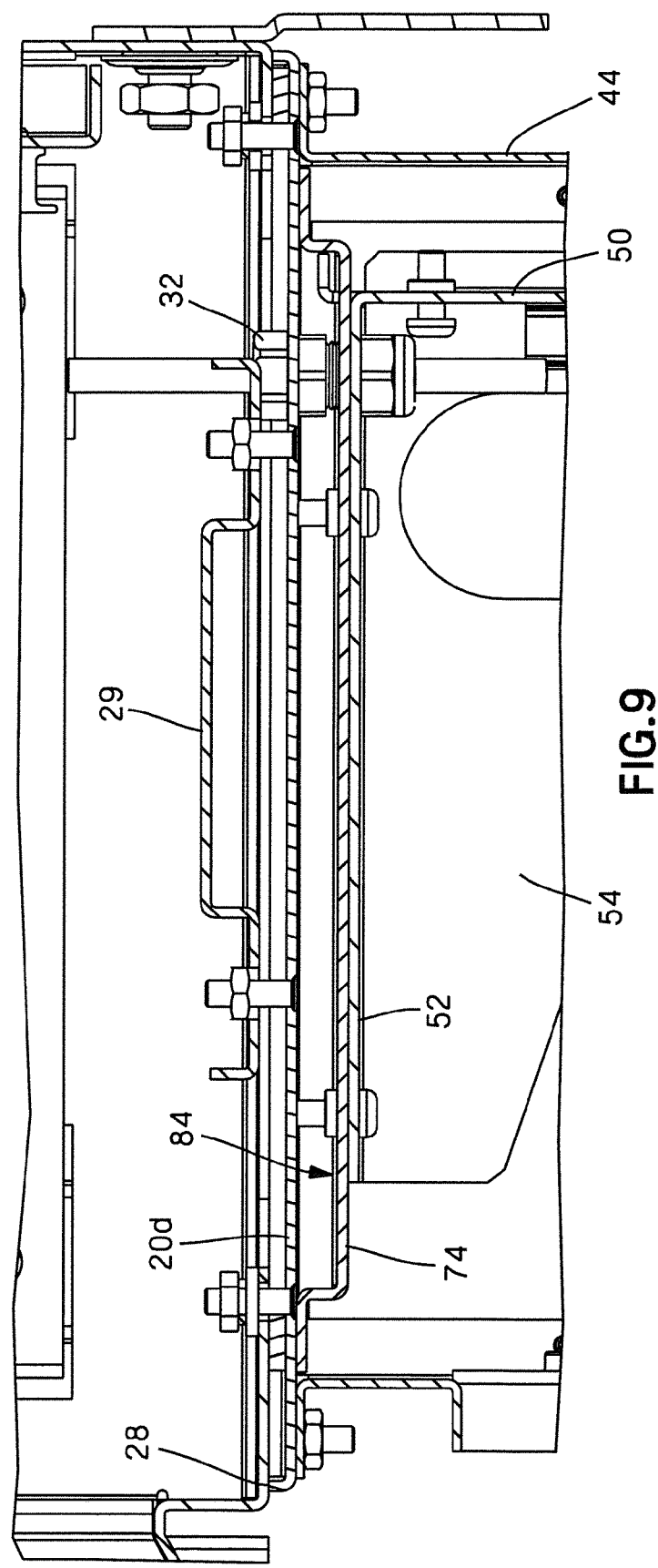
FIG. 9 is a sectional view taken through line 9-9 of FIG. 3.
Figure 10:
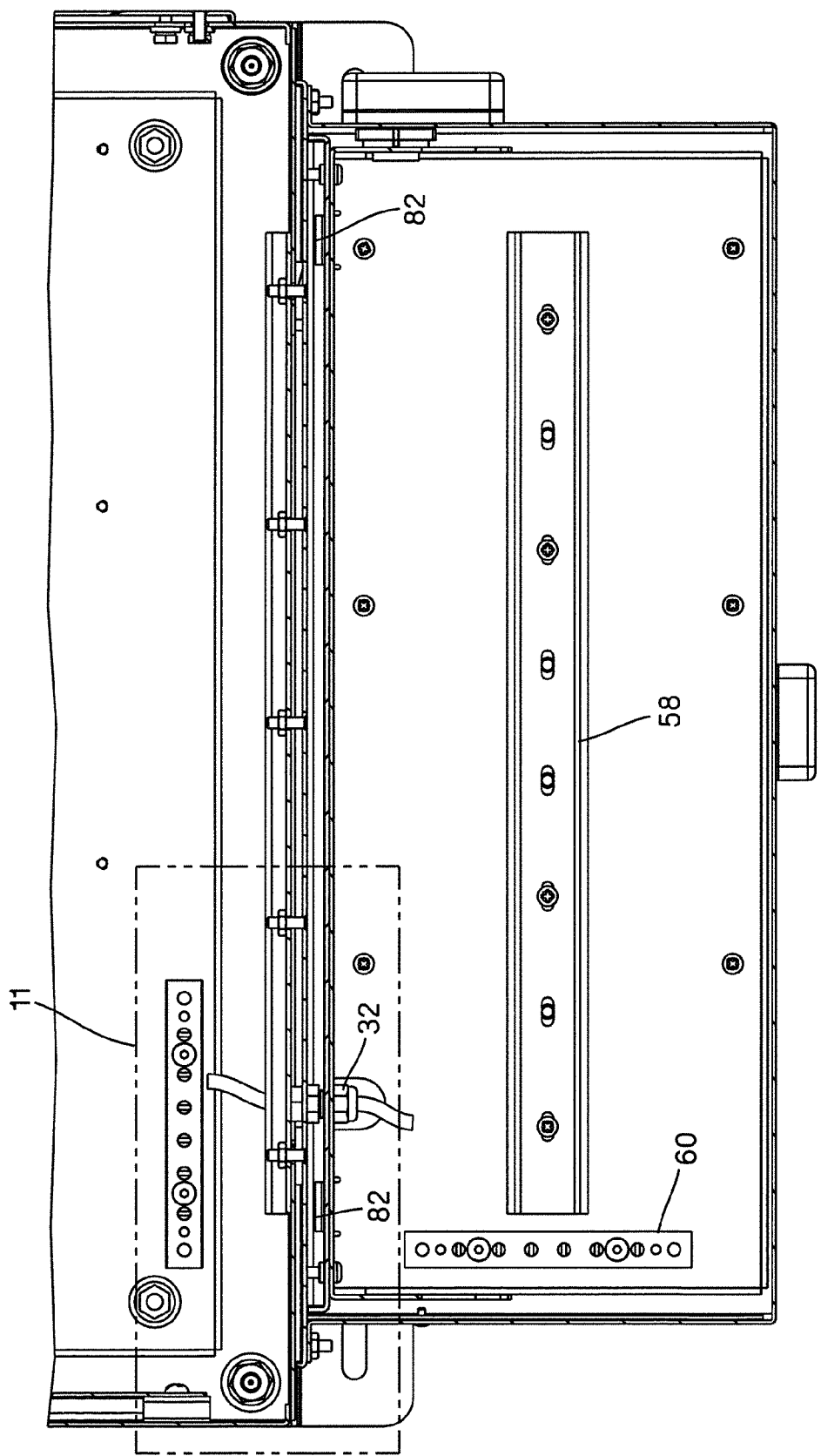
FIG. 10 is a sectional view taken through line 10-10 of FIG. 3.
Figure 11:
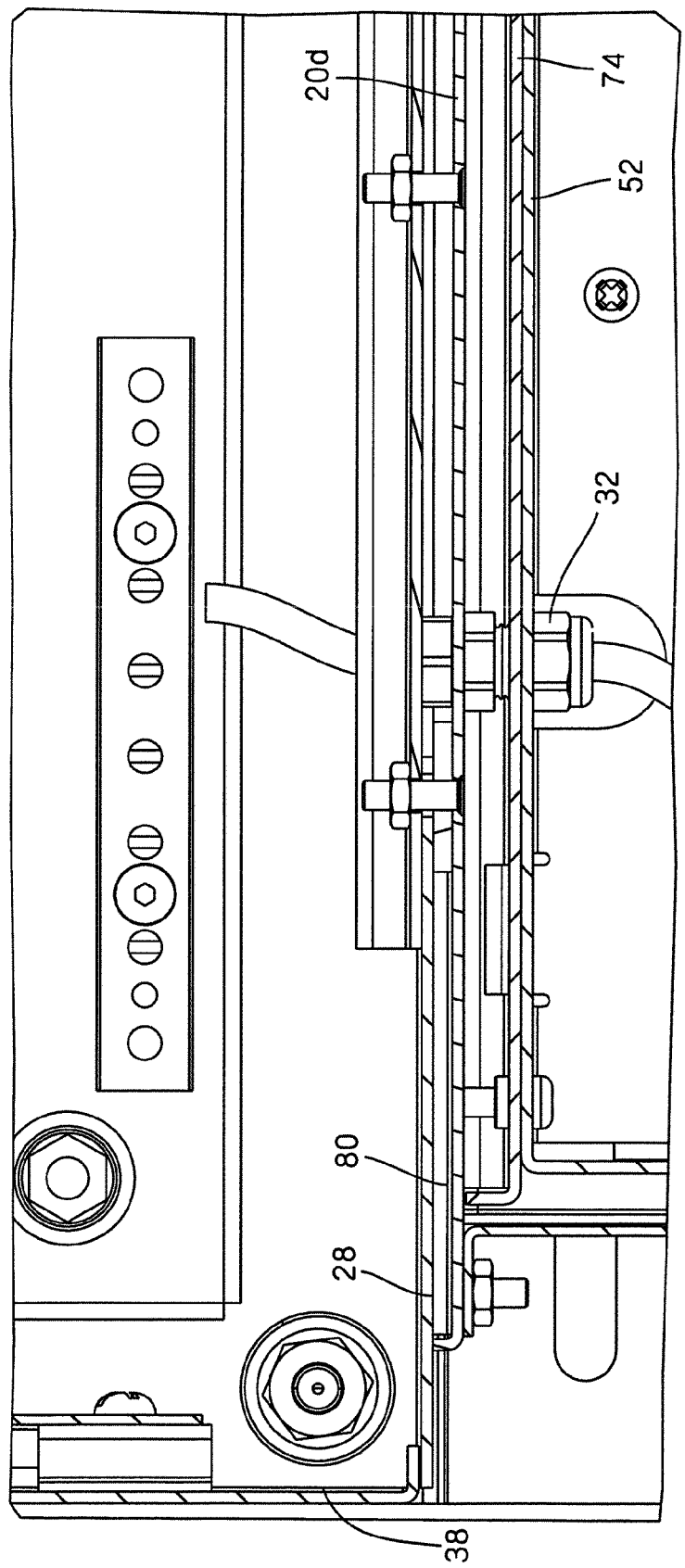
FIG. 11 is a detail view of area 11 of FIG. 10.
Figure 12:
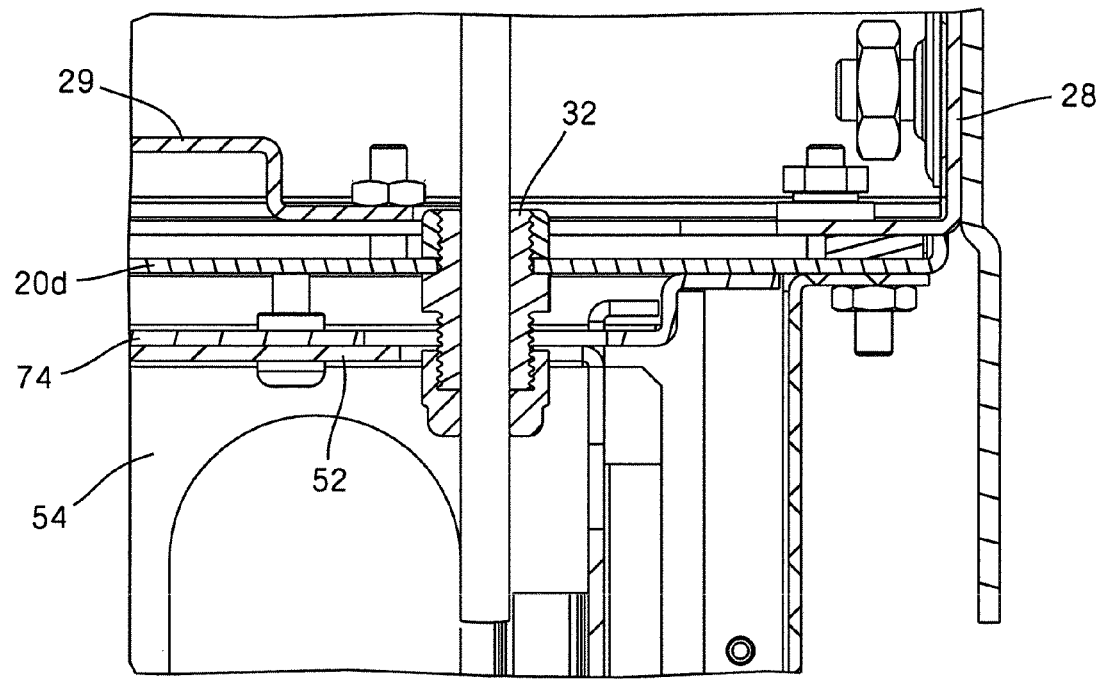
FIG. 12 is a detail view of area 12 of FIG. 8.
Figure 13:
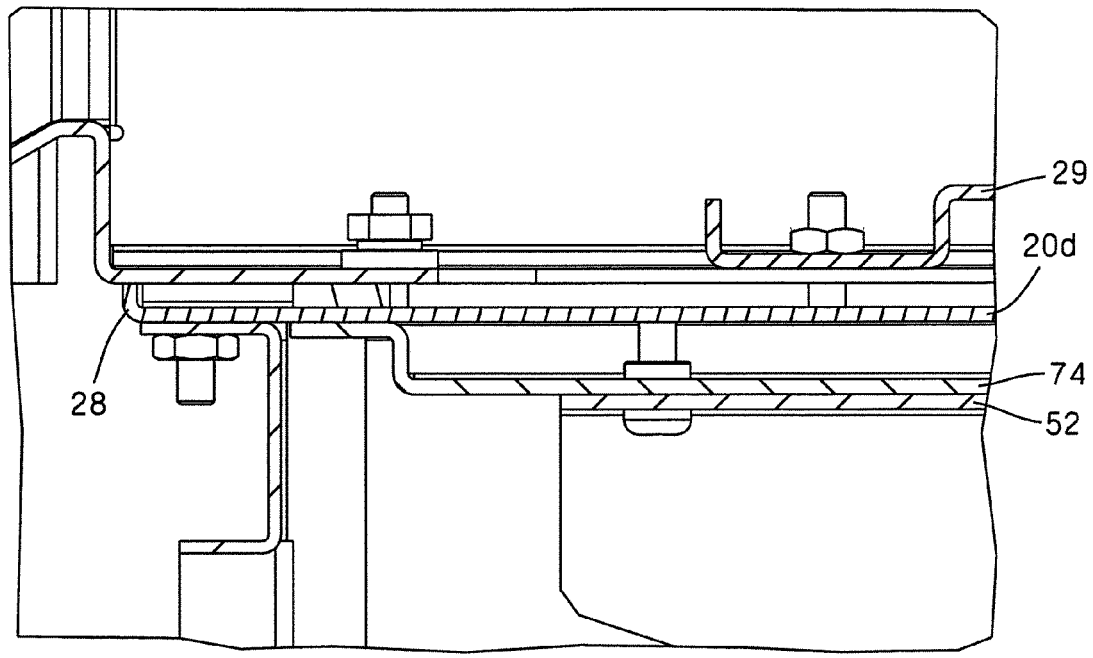
FIG. 13 is a detail view of are 13 of FIG. 8.

FIGS. 8-13 show the spatial relationship to the components described above in connection with the industrial control panel 12. FIGS. 8 and 9 show sectional views taken through lines 8-8 and 9-9 of FIG. 3. FIGS. 8 and 9 depict a gap 84 created between the equipment standoff bracket 74 and the bottom gland plate 20d. FIG. 10 is a sectional view taken through lines 10-10 of FIG. 3 and shows the position of the gasket 82. FIG. 11 is a partial detail view of region 11 of FIG. 10, while FIGS. 12 and 13 are partial detail views of regions 12 and 13 of FIG. 8.

While FIGS. 1-13 depict the equipment segregation unit 14 mounted on the bottom panel 28 of the zone enclosure unit 12, it is contemplated that the equipment segregation unit 14 may mount in a similar manner to any of the other gland plates 20a-c. Thus, a number of configurations for the location of the equipment segregation unit 14 are contemplated. Further, while only a single equipment segregation unit 14 is depicted, it is contemplated that a plurality of equipment segregation units 14 may be provided. Further, while the equipment segregation unit 14 is shown with solid panels 38-44 and door 34, it is also contemplated that at least one vent, for example the vent 43 or a ventilated panel or door may be provided. A ventilated panel or door may allow for gasses to pass from the equipment segregation unit 14, and may also allow for better cooling of the contents of the equipment segregation unit 14. A ventilated panel or door for the equipment segregation unit 14 may be provided in an environment where the chances of fluids penetrating the equipment segregation unit 14 are low, where gasses need to be vented from the equipment segregation unit 14, or where additional cooling ventilation is needed for equipment within the equipment segregation unit 14.

The equipment segregation unit 14 and the zone enclosure unit 12 are each adapted to contain and separate electrical equipment. The equipment segregation unit 14 allows a first set of electrical equipment within the equipment segregation unit 14 to be separated from a second set of electrical equipment within the zone enclosure unit 12. It is contemplated that the first set of electrical equipment is electrically connected to the second set of electrical equipment.

The electrical equipment may be separated between relatively low voltage equipment and relatively high voltage equipment. For instance, the equipment segregation unit 14 may contain electrical equipment that operates at a voltage above a threshold that is required for a qualified person. The zone enclosure unit 12 may contain electrical equipment that operates on a SELV (Safety Extra Low Voltage) circuit featuring limited current and low voltage below the threshold required for a qualified person, meaning a person other than a qualified person may open the zone enclosure unit 12 and maintain the electrical equipment housed within. The National Electrical Code (NEC) states that electrician qualified person is required to maintain the electrical equipment. It is contemplated that electrical equipment that is not operating on a SELV (Safety Extra Low Voltage) circuit may be contained within the equipment segregation unit 14 and electrical equipment that is operating on a SELV (Safety Extra Low Voltage) circuit may be contained within the zone enclosure unit 12.

The electrical equipment may also be separated by the type of electrical equipment, a first set of electrical equipment being of a first type and a second set of electrical equipment being of a second type. For example, the electrical equipment housed within the equipment segregation unit 14 may be used to provide power to the electrical equipment in the zone enclosure unit 12. For instance, a primary power circuit providing AC power from about 100 volts to about 600 volts may enter the equipment segregation unit 14. Equipment within the equipment segregation unit 14 may transform the input AC voltage and current into current-limited lower voltage DC power, such as, for example, 24 volt DC power. The equipment segregation unit 14 may also contain a battery and/or an uninterruptable power supply that may operate on either AC or DC voltage that may provide a secondary circuit to power equipment within the zone enclosure unit 12. Such electrical equipment in the equipment segregation unit 14 can be used to provide power to the electrical equipment in the zone enclosure unit 12.

It is additionally contemplated that the equipment segregation unit 14 and the zone enclosure unit 12 may separate equipment with different susceptibility to electromagnetic interference (EMI). For instance, the equipment segregation unit 14 may contain equipment that is highly susceptible to EMI, while the zone enclosure unit 12 may contain equipment less susceptible to EMI. In such an embodiment, the equipment segregation 14 unit may be adapted to shield electrical equipment within the equipment segregation unit 14 from electromagnetic interference. For example, the panels 38-44 of the external cover assembly 46 may be made of a known electromagnetic shielding material, or have a coating of known electromagnetic shielding material applied.

It is additionally contemplated that the equipment segregation unit 14 and the zone enclosure unit 12 may separate equipment according to heat generation. Equipment that generates a significant amount of heat may be placed in the equipment segregation unit 14 while equipment that generates less heat may be placed within the zone enclosure unit 12.

The equipment segregation unit 102 may be vented and the heat directed away from the electrical equipment within the zone enclosure unit 12, which can improve the operating environment of the equipment within the zone enclosure unit 12 as the temperature within the zone enclosure unit 12 may remain lower.

Figure 14:
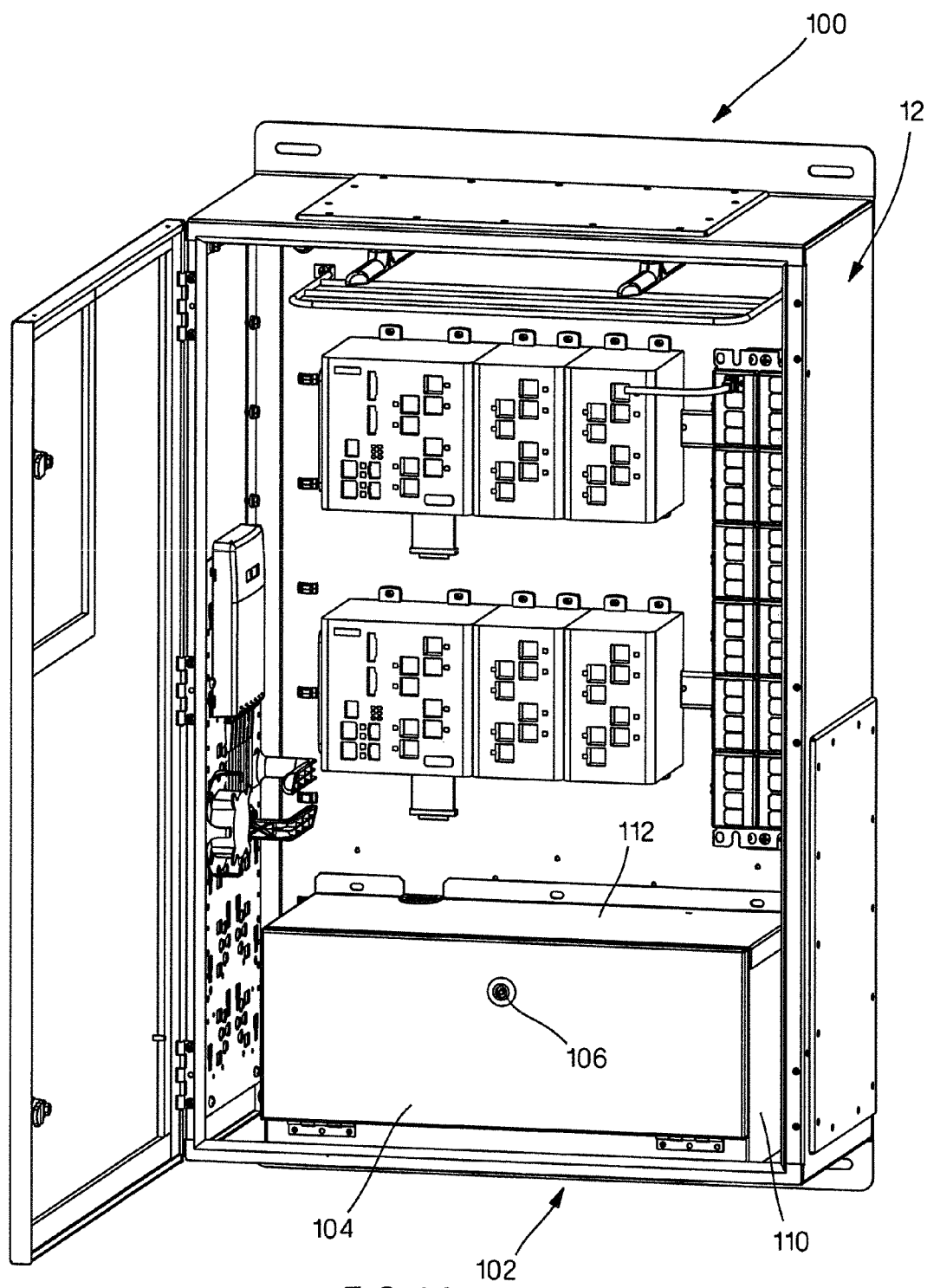
FIG. 14 is a perspective view of an industrial control panel according to another embodiment of the present invention.
Figure 15:
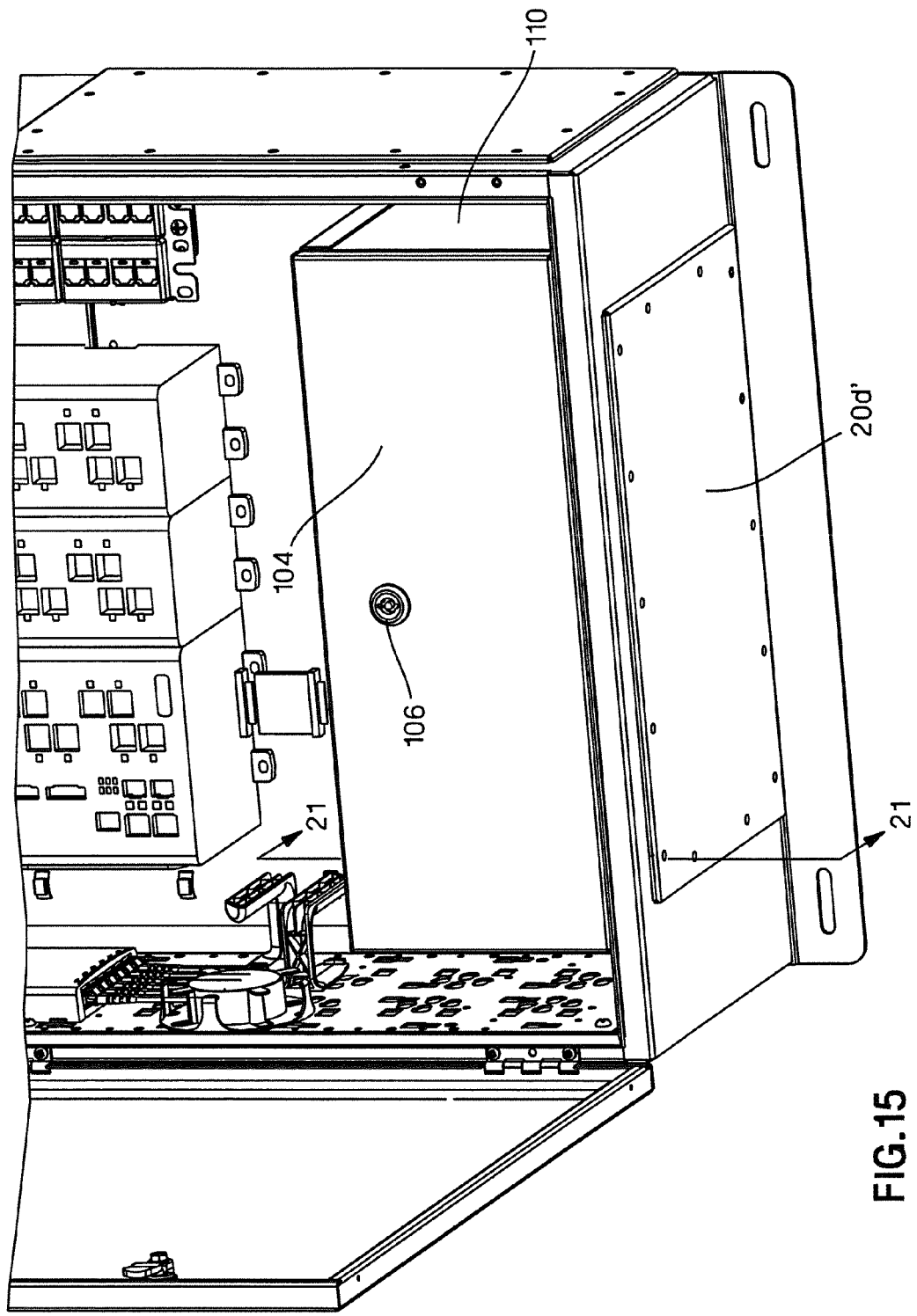
FIG. 15 is a detailed perspective view of a portion of the industrial control panel of FIG. 14.

FIGS. 14-21 illustrate a second embodiment of the present invention. FIG. 14 illustrates an industrial control panel 100, which comprises the zone enclosure unit 12 described above, as well as an equipment segregation unit 102 where the equipment segregation unit 102 is mounted to an inner surface of the zone enclosure unit 12. The zone enclosure unit 12 may be provided with a slightly modified bottom gland plate 20d' (FIG. 15) that lacks the opening 31 of the bottom gland plate 20d. The zone enclosure unit 12 may also lack the hat channel bracket 29 shown in FIGS. 1-13, but otherwise the zone enclosure unit 12 is generally similar to the zone enclosure unit described above with reference to FIGS. 1-13.

The equipment segregation unit 102 is disposed within the zone enclosure unit 12 of the industrial control panel 100. The equipment segregation unit 102 comprises a left side panel 108 (FIG. 16), a right side panel 110, and a top panel 112. The door 104, left side panel 108, right side panel 110, and top panel 112 form an internal cover assembly 114 for the equipment segregation unit 102. The top panel 112 has a grommet 130 disposed within an opening 131 in the top panel 112. The grommet 130 may be made of a polymeric material that forms a seal about any wiring or conduit that exits the equipment segregation unit 102, while restricting the entry of fluids into the equipment segregation unit 102.

Figure 16:
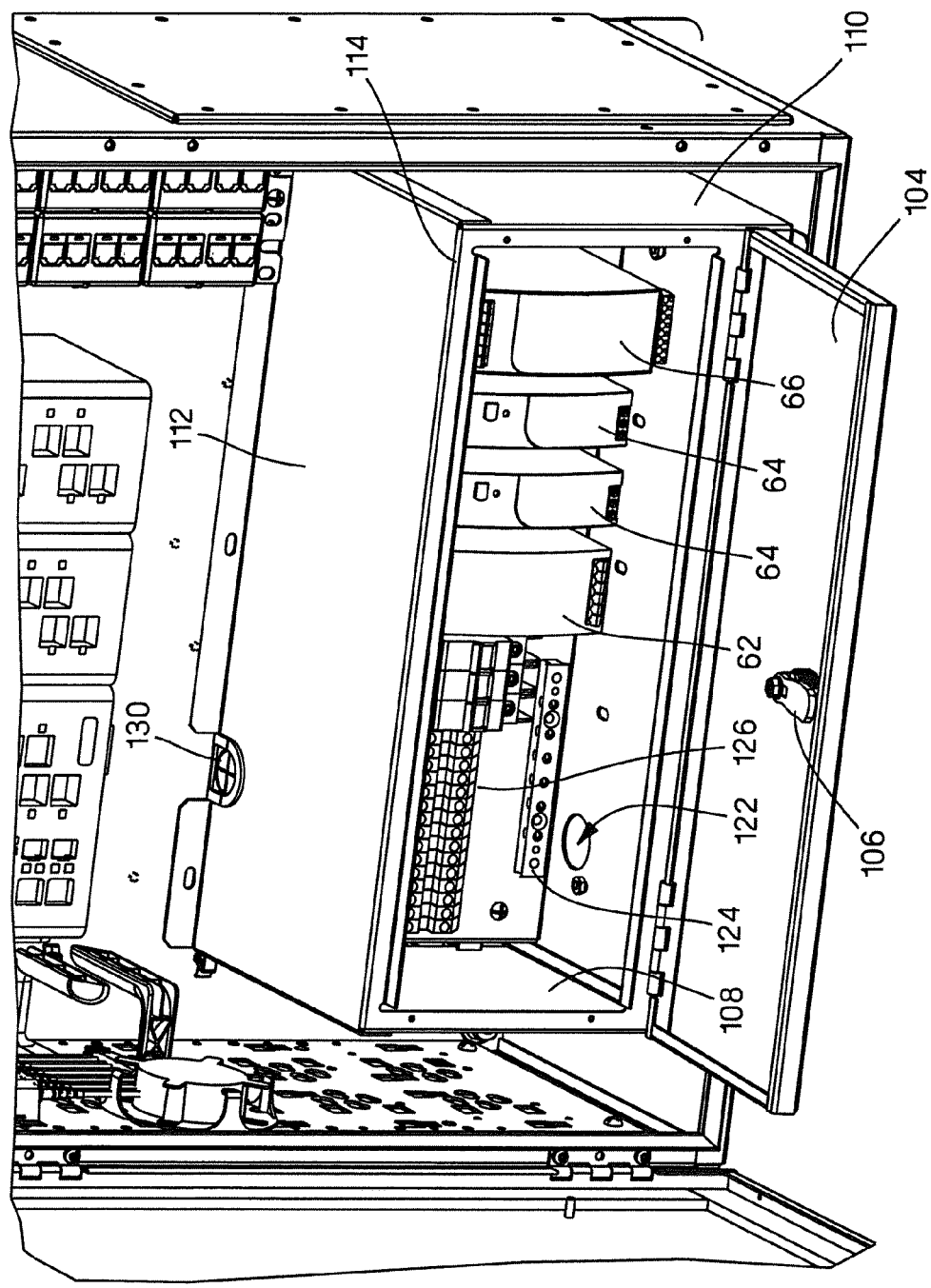
FIG. 16 is a detailed perspective view of a portion of the industrial control panel of FIG. 14 with a front panel in of an equipment segregation unit in an open position.

The equipment segregation unit 102 also may comprise a door 104 moveable between a closed position (FIG. 14) and an open position (FIG. 16). The door 104 may be secured in the closed position by a lock 106. The lock 106 on the door 104 of the equipment segregation unit 102 may be operated by a key, or may be operated by other known locking systems such as a combination, biometric information, or any other known locking system.

Figure 17:
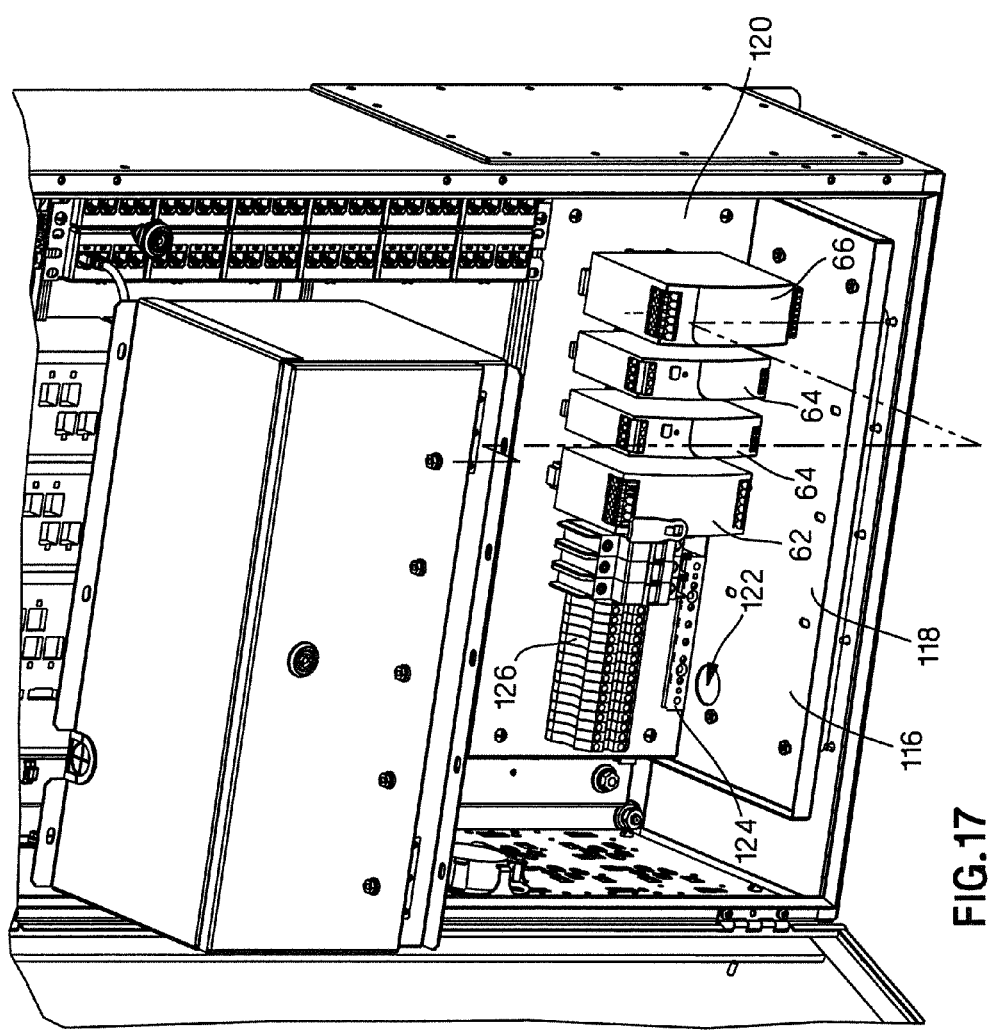
FIG. 17 is a detailed perspective view of a portion of the industrial control panel of FIG. 14 with an internal cover assembly removed.
Figure 18:
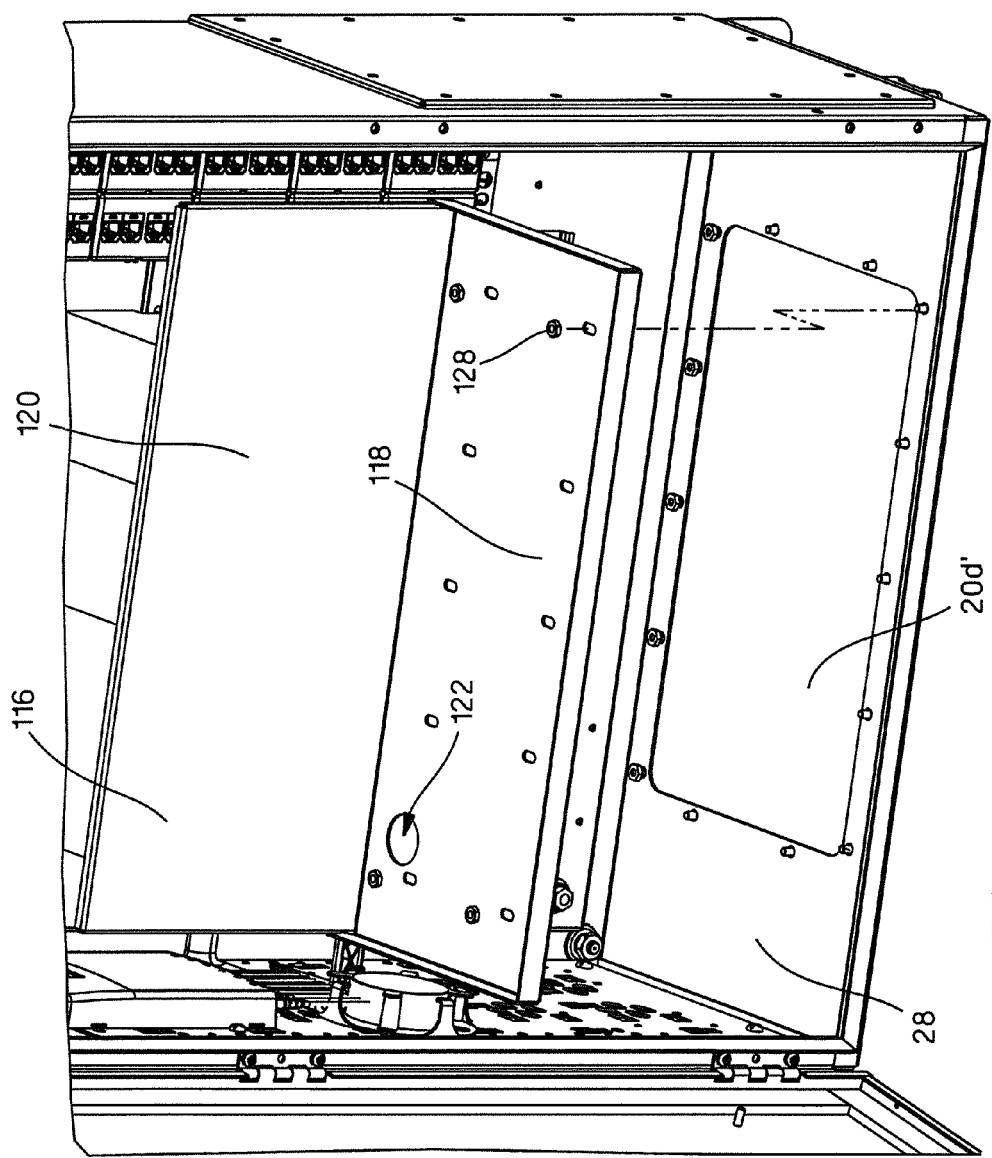
FIG. 18 is a perspective view of an internal power base of the equipment segregation unit of FIG. 14.

The equipment segregation unit 102 further may include an internal power base 116 as best shown in FIG. 17. The internal power base 116 has a bottom panel 118 and a back panel 120 (FIG. 18). The bottom panel 118 may have an opening 122 formed there through to allow wiring to enter or exit the equipment segregation unit 102 in some embodiments. The back panel 120 of the internal power base 116 may have a ground bar 124 and electrical connectors 126 (FIG. 17) to allow electrical equipment, such as the surge protector or filter 62, the power supply 64, the DC Universal Power Supply 66, circuit breakers (not shown), interface modules (not shown), or any other known electrical equipment to be mounted within the equipment segregation unit 102.

Figure 19:
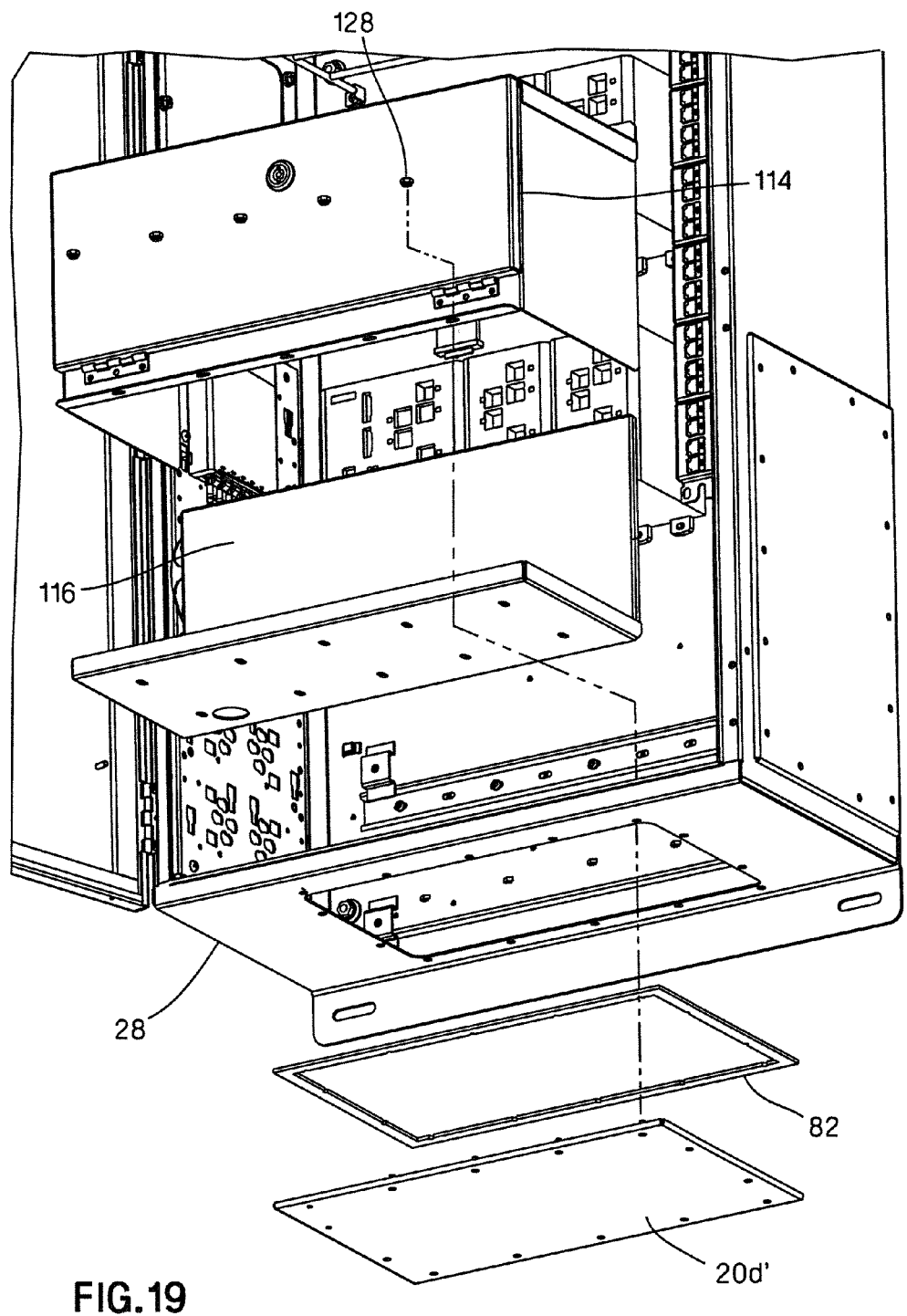
FIG. 19 is an exploded view of the equipment segregation unit of FIG. 14.
Figure 20:
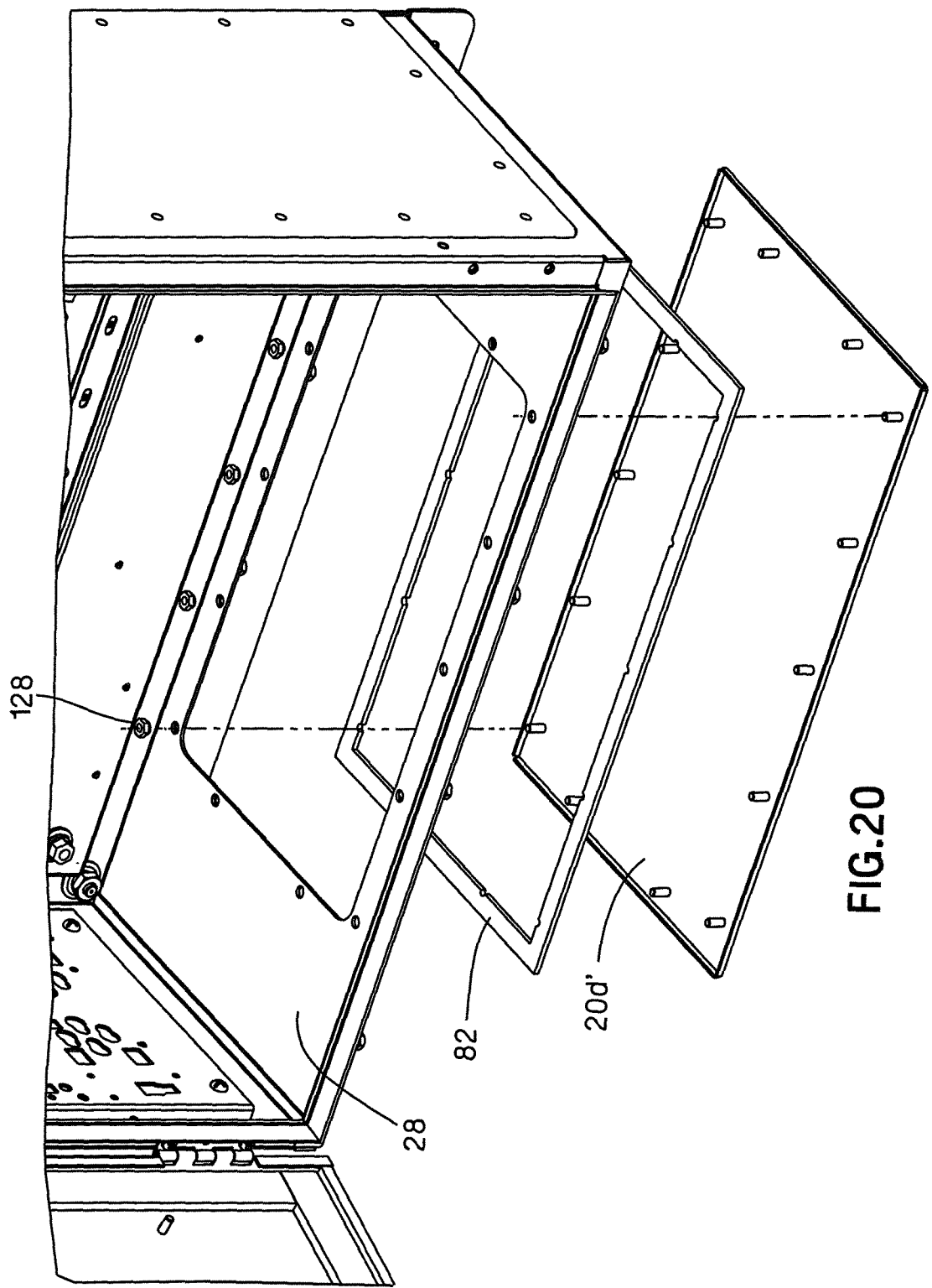
FIG. 20 is an exploded view of a portion of a zone enclosure of FIG. 14.
Figure 21:
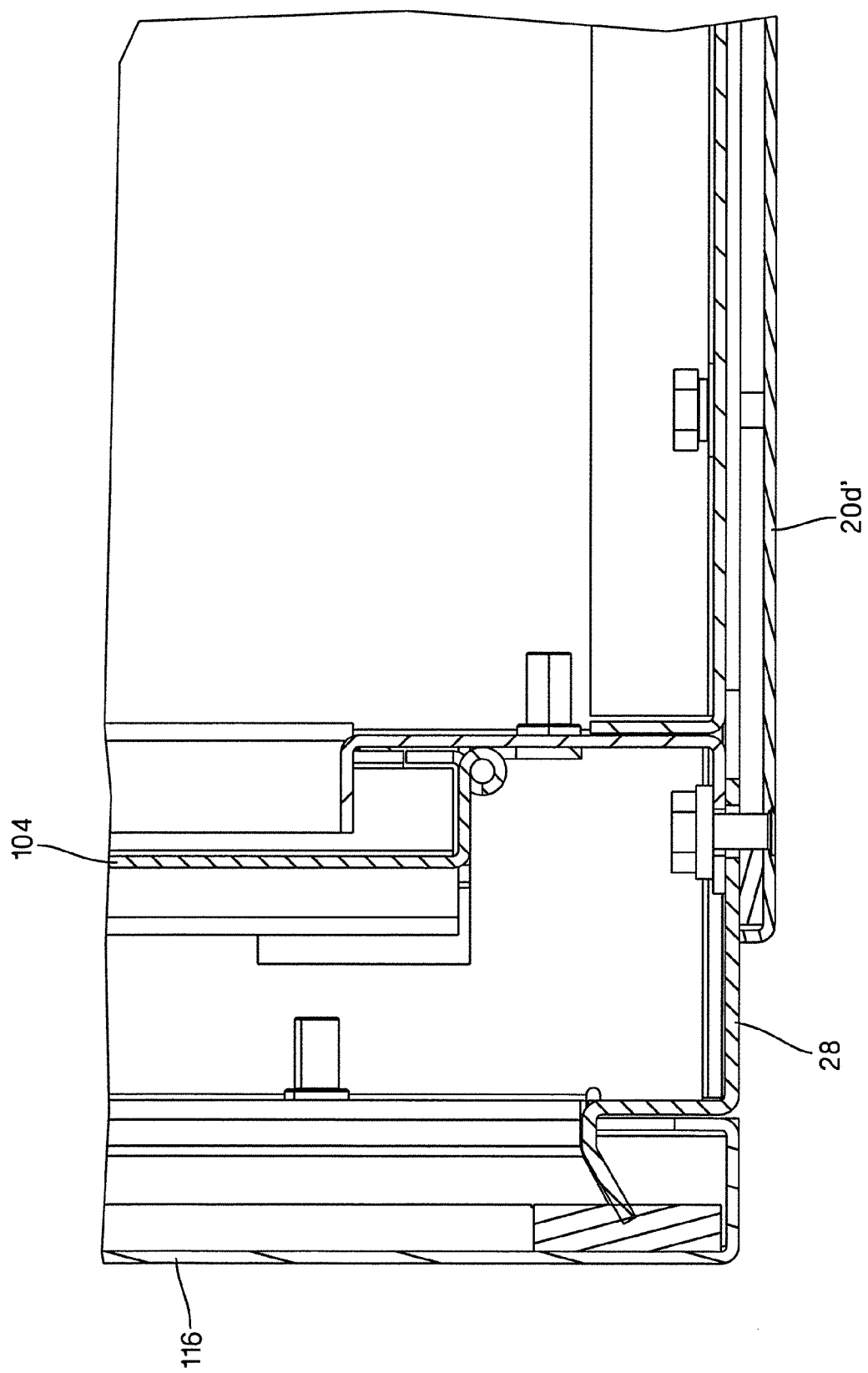
FIG. 21 is a sectional view taken through line 21-21 of FIG. 15.

As shown in FIG. 18, the internal power base 116 may be mounted to the bottom panel 28 of the zone enclosure unit 12 via a plurality of fasteners 128, such as bolts, screws, rivets, or the like. As shown in FIGS. 19-20 it is contemplated that at least some of the plurality of fasteners 128 may pass through the bottom gland plate 20d', the bottom panel 28 of the zone enclosure unit 12, the internal power base 116 and the internal cover assembly 114. The gasket 82 may be provided between the bottom gland plate 20d' and the bottom panel 28 of the zone enclosure unit 12. The gasket 82 is disposed proximate the perimeter of the bottom gland plate 20d'. The gasket 82 forms a seal, for example, a water, gas, particulate, contaminate, vapor, dust, or moisture resistant barrier to the interior of the zone enclosure unit 12. FIG. 21 is a sectional view taken through line 21-21 of FIG. 15, which illustrates the bottom gland plate 20d', the bottom panel 28 of the zone enclosure 12, internal power base 116 and the door 104.

While FIGS. 14-21 depict the equipment segregation unit 102 on the bottom panel 28 of the zone enclosure unit 12, it is contemplated that the equipment segregation unit 102 may mount in a similar manner to any of the other gland plates 20a-c of the zone enclosure unit 12. Thus, a number of configurations for the location of the equipment segregation unit 102 are contemplated. Further, while only a single equipment segregation unit 102 is depicted within the zone enclosure unit 12, it is contemplated that a plurality of equipment segregation units 102 may be provided. Further, while the equipment segregation unit 102 is shown with solid panels 108-112, and door 104, it is also contemplated that at least one vent, for example the vent 43 or a ventilated panel or door may be provided. A ventilated panel or door may allow for gasses to pass from the equipment segregation unit 102, and may also allow for better cooling of the contents of the equipment segregation unit 102.

As discussed with reference to FIGS. 1-13, the equipment segregation unit 102 and the zone enclosure unit 12 are each adapted to contain and separate electrical equipment. The equipment segregation unit 102 allows a first set of electrical equipment within the equipment segregation unit 102 to be separated from a second set of electrical equipment within the zone enclosure unit 12. It is contemplated that the first set of electrical equipment is electrically connected to the second set of electrical equipment.

The electrical equipment may be separated between relatively low voltage equipment and relatively high voltage equipment. For instance, the equipment segregation unit 102 may contain electrical equipment that operates at a voltage above a threshold that is required for a licensed electrician. The zone enclosure unit 12 may contain electrical equipment that operates on a SELV (Safety Extra Low Voltage) circuit featuring limited current and low voltage below the threshold required for a qualified person, meaning a person other than a qualified person may open the zone enclosure unit 12 and maintain the electrical equipment housed within. The National Electrical Code (NEC) states that electrician qualified person is required to maintain the electrical equipment. It is contemplated that electrical equipment that is not operating on a SELV (Safety Extra Low Voltage) circuit may be contained within the equipment segregation unit 102 and electrical equipment that is operating on a SELV (Safety Extra Low Voltage) circuit may be contained within the zone enclosure unit 12.

The electrical equipment may also be separated by the type of electrical equipment, a first set of electrical equipment being of a first type and a second set of electrical equipment being of a second type. For example, the electrical equipment housed within the equipment segregation unit 102 may be used to provide power to the electrical equipment in the zone enclosure unit 12. For instance, a primary power circuit providing AC power from about 100 volts to about 600 volts may enter the equipment segregation unit 14. Equipment within the equipment segregation unit 102 may transform the input AC voltage and current into current-limited lower voltage DC power, such as, for example, 24 volt DC power. The equipment segregation unit 102 may also contain a battery and/or an uninterruptable power supply that may operate on either AC or DC voltage that may a secondary circuit to power equipment within the zone enclosure unit 12. Such electrical equipment in the equipment segregation unit 102 can be used to provide power to the electrical equipment in the zone enclosure unit 12.

It is additionally contemplated that the equipment segregation unit 102 and the zone enclosure unit 12 may separate equipment with different susceptibility to electromagnetic interference. For instance, the equipment segregation unit 102 may contain equipment that is highly susceptible to EMI, while the zone enclosure unit 12 may contain equipment less susceptible to EMI. In such an embodiment, the equipment segregation 102 unit may be adapted to shield electrical equipment within the equipment segregation unit 102 from electromagnetic interference. For example, the panels 108-112 of the internal cover assembly 114 may be made of a known electromagnetic shielding material, or have a coating of a known electromagnetic shielding material applied.

It is additionally contemplated that the equipment segregation unit 102 and the zone enclosure unit 12 may separate equipment according to heat generation. Equipment that generates a significant amount of heat may be placed in the equipment segregation unit 102 while equipment that generates less heat may be placed within the zone enclosure unit 12. The equipment segregation unit 102 may be vented, for example by a panel or vent 43, and the heat directed away from the electrical equipment within the zone enclosure unit 12, which can improve the operating environment of the equipment within the zone enclosure unit 12 as the temperature within the zone enclosure unit 12 may remain lower.

Figure 22:
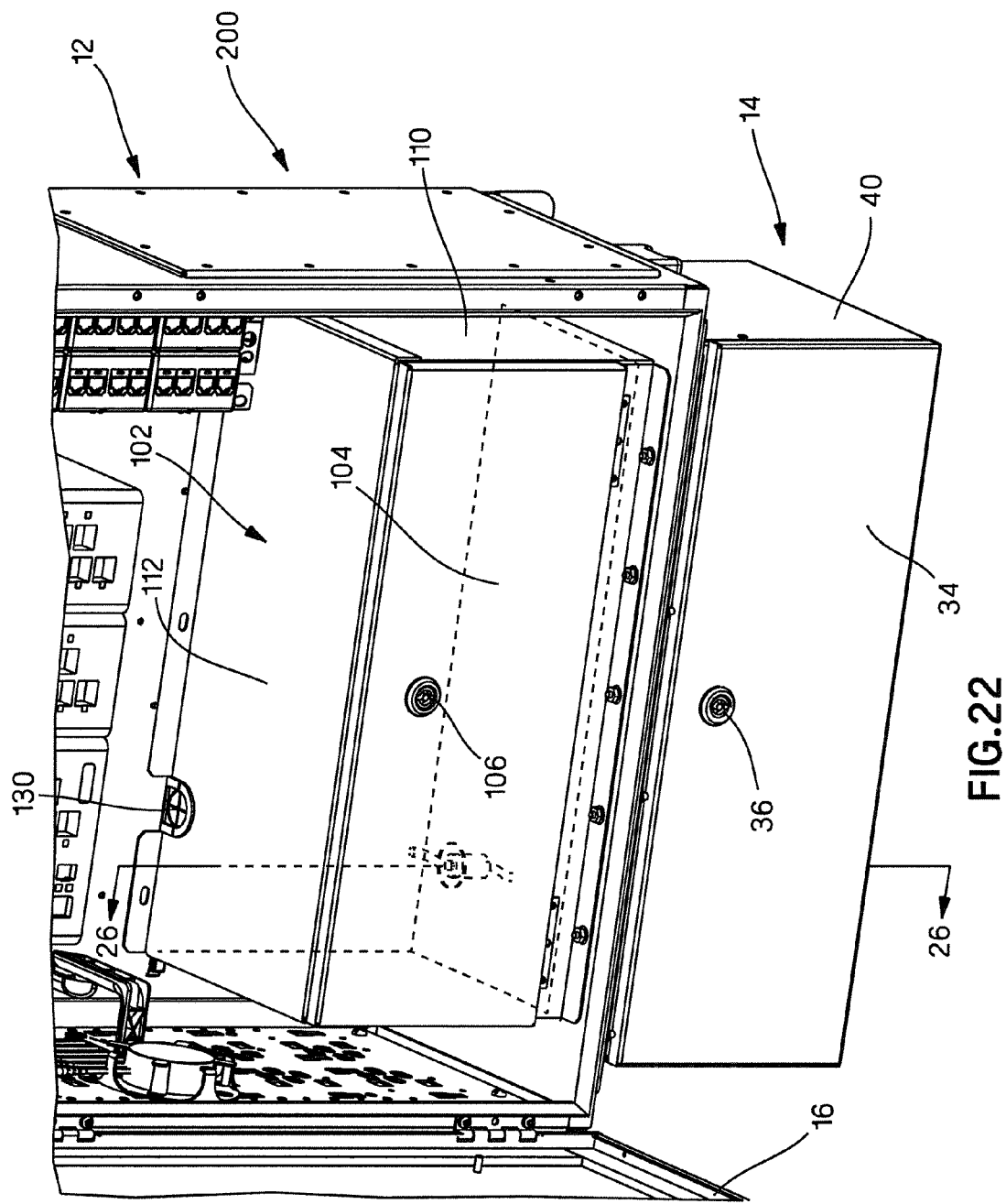
FIG. 22 is a perspective view of a portion of an industrial control panel according to another embodiment of the present invention.

FIGS. 22-27 illustrate a third embodiment of the present invention. FIG. 22 illustrates an industrial control panel 200, which comprises the zone enclosure unit 12 as described above with reference to FIGS. 1-21, an external equipment segregation unit 14 that is mounted to an outer surface of the zone enclosure unit 12 as described above with reference to FIGS. 1-13, and an internal equipment segregation unit 102 that is mounted to an inner surface of the zone enclosure unit 12 as described above with reference to FIGS. 14-21. In FIGS. 22-27, the external equipment segregation unit 14 is shown mounted to an external surface of the bottom panel 28 of the zone enclosure unit 12. The internal equipment segregation unit 102 is shown mounted to an internal surface of the bottom panel 28 of the zone enclosure unit 12. The zone enclosure unit 12, the external equipment segregation unit 14 and the internal equipment segregation unit 102 generally have a similar structure and are mounted in a similar manner as described above with reference to FIGS. 1-21.

Figure 23:
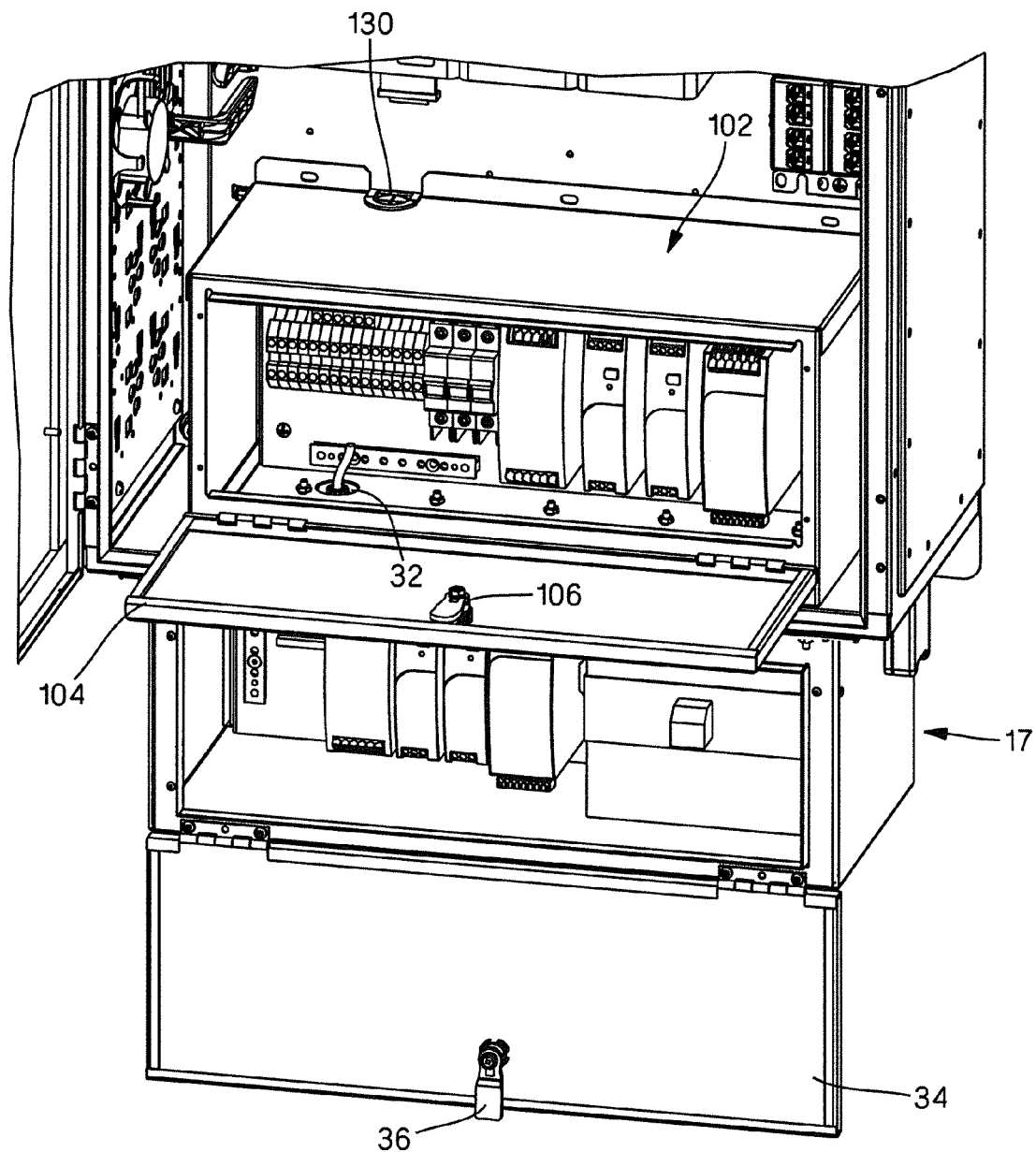
FIG. 23 is a detailed perspective view of a portion of the industrial control panel of FIG. 22 with front panels of equipment segregation units in an open position.

As shown in FIGS. 22-23, the external equipment segregation unit 14, the zone enclosure unit 12 and the internal equipment segregation unit 102 are each adapted to contain and separate electrical equipment. In general, as described above, the interior of the zone enclosure unit 12 is separated from the interior of the external equipment segregation unit 14, which are separated from the interior of the internal equipment segregation unit 102. A water, gas, particulate, contaminate, vapor, dust, or moisture resistant barrier that separates the interior of the zone enclosure unit 12 from the interior of the external equipment segregation unit 14, from the interior of the internal equipment segregation unit 102 is contemplated.

Figure 24:
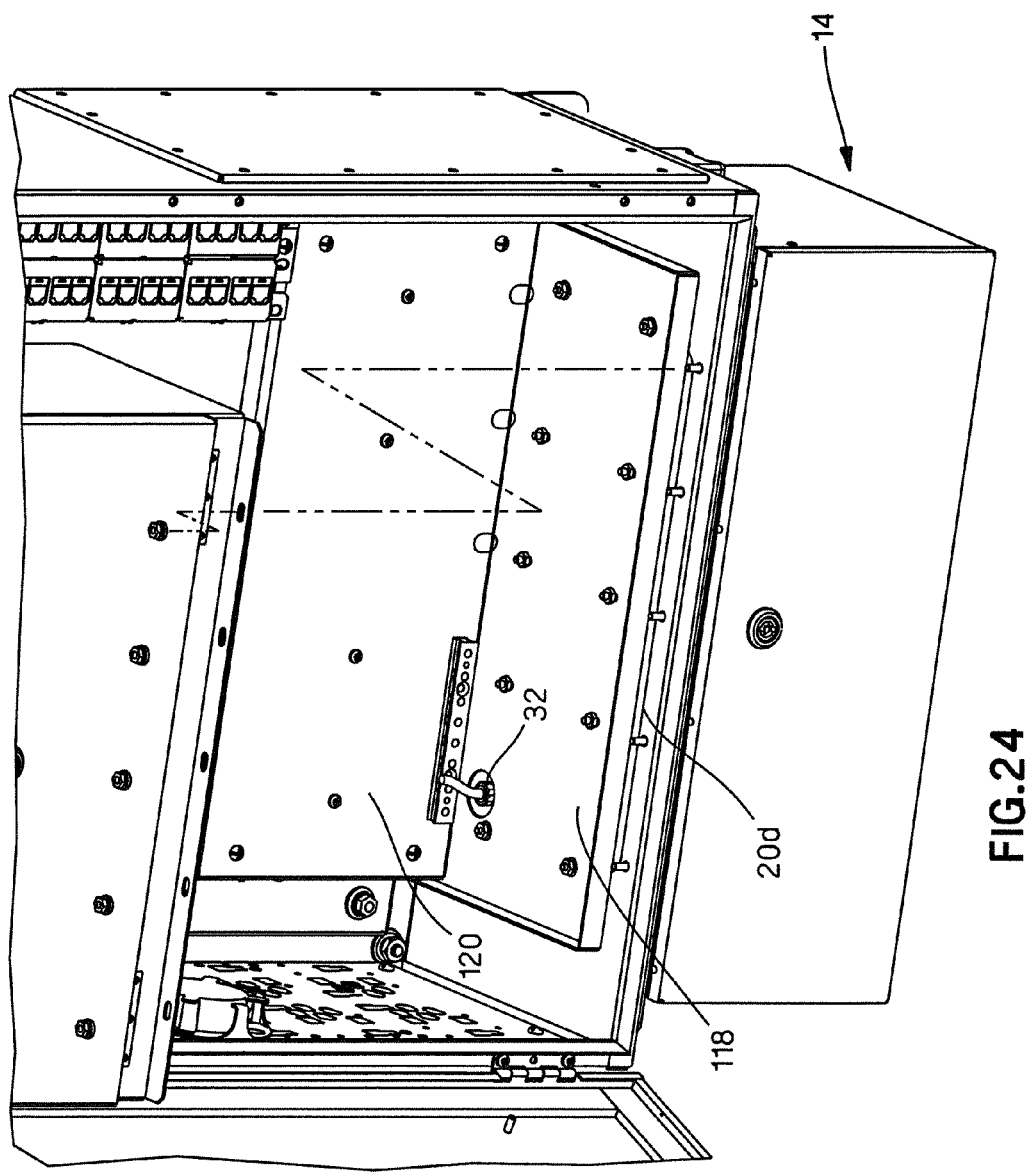
FIG. 24 is a partial exploded view of a portion of an internal equipment segregation unit of the industrial control panel of FIG. 22.
Figure 25:
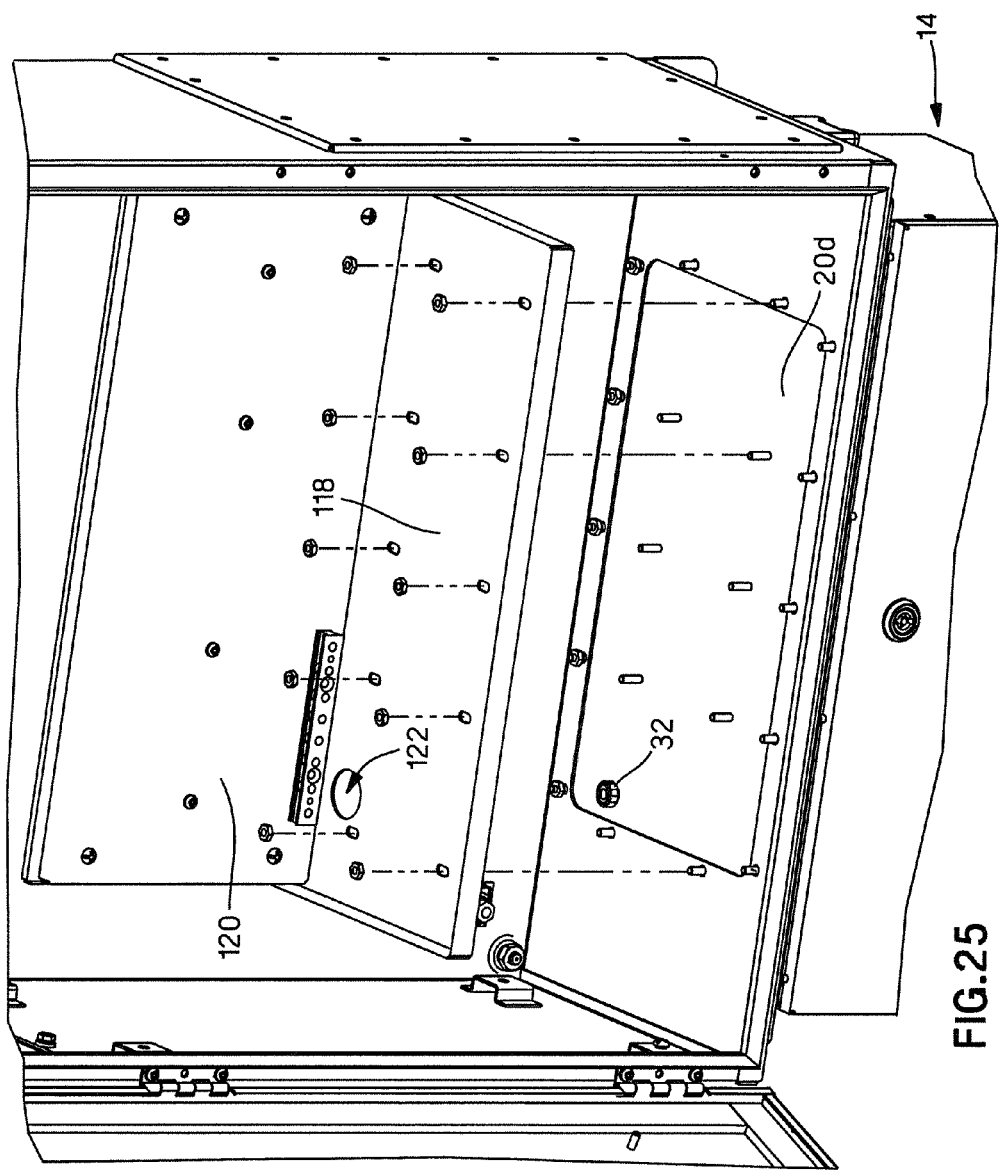
FIG. 25 is a partial exploded view of a portion of an internal equipment segregation unit of the industrial control panel of FIG. 22.

The electrical equipment contained within the external equipment segregation unit 14, the electrical equipment within the internal equipment segregation unit 102 and the electrical equipment within the zone enclosure unit 12 may be electrically interconnected. As shown in FIGS. 24 and 25, the bottom gland plate 20d of the zone enclosure unit 12 separates the external equipment segregation unit 14 from the internal equipment segregation unit 102. The opening 31 (FIGS. 6-7) of the bottom gland plate 20d aligns with the opening 68 (FIG. 5) in the external equipment mounting bracket 48, the opening 80 (FIG. 5) within the equipment standoff bracket 74 (FIG. 7), and the opening 122 (FIG. 18) in the bottom panel 118 of the internal power base 116 (FIG. 24) to allow the gland fitting 32 (FIGS. 24, 26 and 27) to pass from the external equipment segregation unit 14 to the internal equipment segregation unit 102.

As shown in FIG. 23, the equipment segregation unit 102 has a grommet 130 disposed within an opening 131 in the top panel 112 of the equipment segregation unit. The grommet 130 may be made of a polymeric material that form is a seal about any wiring or conduit that exits the equipment segregation unit 102, while restricting the entry of fluids into the equipment segregation unit 102. Thus, there may be an electrical connection from the external equipment segregation unit 14 to the internal equipment segregation unit 102 and an electrical connection from the internal equipment segregation unit 102 to the zone enclosure unit 12.

Figure 26:
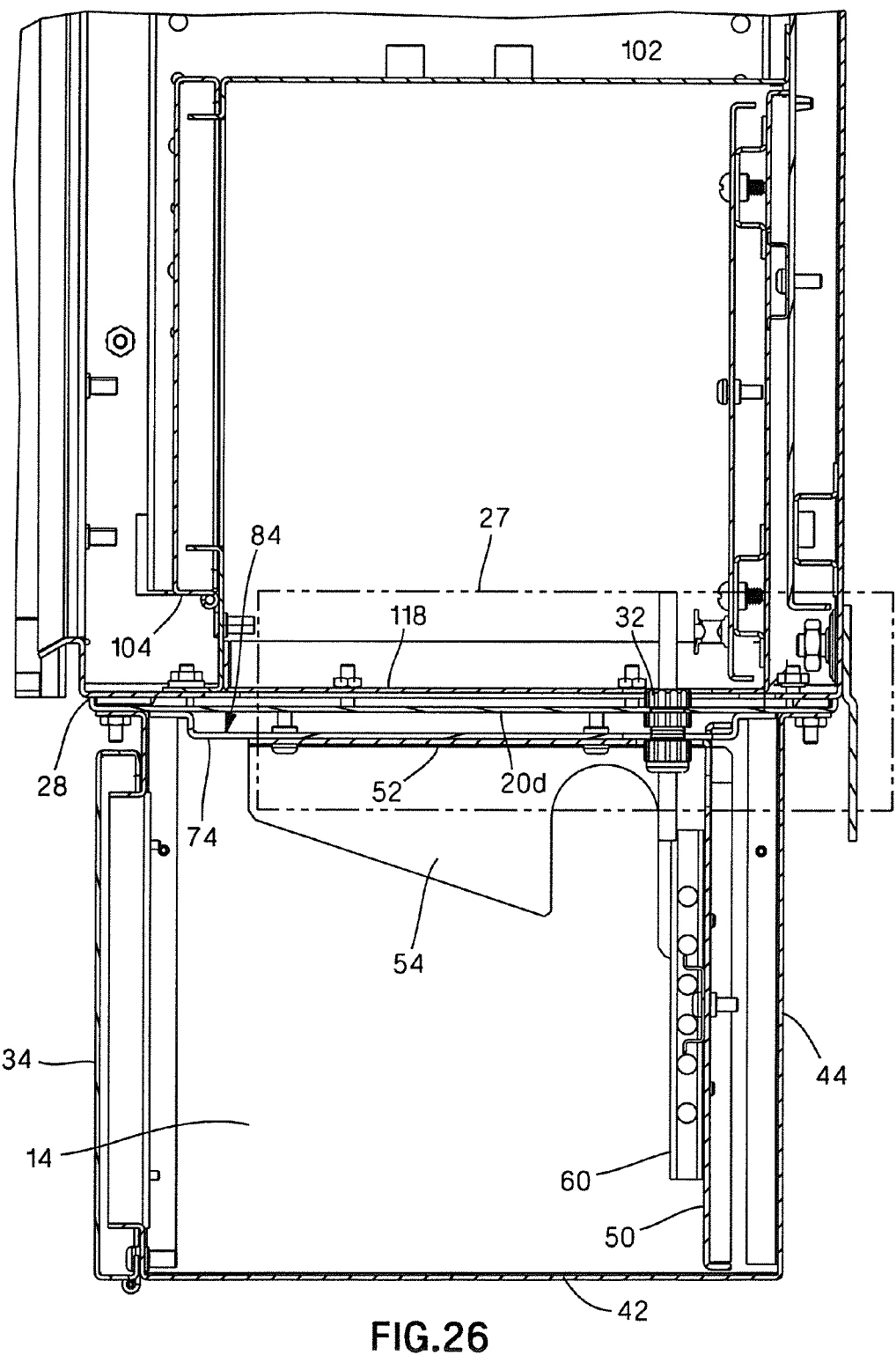
FIG. 26 is a sectional view taken through line 26-26 of FIG. 22.

FIG. 26 is a sectional view taken through line 26-26 of FIG. 22 which further illustrates the connection of the external equipment segregation unit 14 to the zone enclosure unit 12, and the internal equipment segregation unit 102 to the zone enclosure unit 12. The gland plate 20d is shown mounted between the top panel 52 of the external equipment segregation unit 14 and the bottom panel 28 of the internal equipment segregation unit 102. The equipment standoff bracket 74 is shown attached to the bottom gland plate 20d of the zone enclosure unit 12 and the top panel 52 of the external equipment segregation unit 14. The gap 84 created between the equipment standoff bracket 74 and the bottom gland plate 20d is also shown. The bottom panel 118 of the internal power base 116 is also shown. A gland fitting 32 is shown to allow passage of electrical equipment between the external equipment segregation unit 14 and the internal equipment segregation unit 102.

Figure 27:
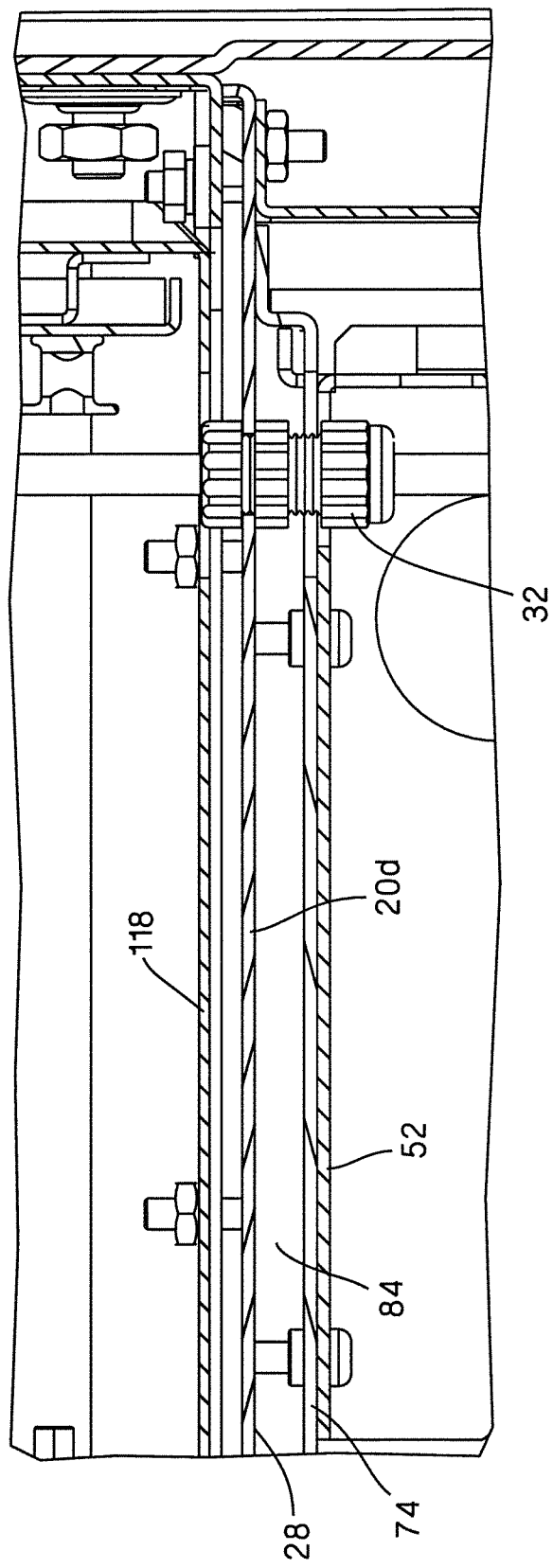
FIG. 27 is a detailed view of area 27 of FIG. 26.

FIG. 27 is a detailed view of area 27 of FIG. 26. The gland plate 20d is shown mounted between the top panel 52 of the external equipment segregation unit 14 and the bottom panel 28 of the internal equipment segregation unit 102. The gap 84 created between the equipment standoff bracket 74 and the bottom gland plate 20d is also shown. The gland fitting 32 is also shown.

The use of both an internal equipment segregation unit 102 and an external equipment segregation unit 14 may provide access restrictions to the electrical equipment within the industrial control panel 200. For example, as shown in FIGS. 22-24, it is contemplated that there is a lock 36 on the door 34 of the external equipment segregation unit 14 and a lock 106 on the door 104 of the internal equipment segregation unit 102. Each of the locks 36 and 106 may be operated by a key, or may be operated by other known locking systems such as a combination, biometric information, or any other known locking system. It is also contemplated that different personnel may have keys required to open the lock 18 of the door 16 of the zone enclosure unit, the lock 36 of the door 34 of the external equipment segregation unit 14, and the lock 106 of the door 104 of the internal equipment segregation unit 102. For example, a licensed electrician may have a key to unlock the lock 36 of the door 34 of the external equipment segregation unit 14, a manufacturer may have a key to unlock the lock 106 of the door 104 of the internal equipment segregation unit 102, and an information technology professional may have a key to unlock the lock 18 of the door 16 of the zone enclosure unit. Accordingly, access to the different sets of electrical equipment may be controlled across multiple personnel. Such access restrictions may reduce the need for specific personnel, such as a licensed electrician, to be present before certain modifications can be made to the electrical equipment within the industrial control panel 200.

As discussed above with respect to FIGS. 1-21, it is contemplated that the internal equipment segregation unit 102 and the external equipment segregation unit 14 may mount to any of the other gland plates 20a-c of the zone enclosure unit 12. Thus, a number of configurations for the location of the internal equipment segregation unit 102 and external equipment segregation unit 14 are contemplated. Further, while only a single internal equipment segregation unit 102 and a single external equipment segregation unit 14 are depicted, it is contemplated that a plurality of internal equipment segregation units 102 and external equipment segregation units 14 may be provided. Further, it is contemplated that the internal equipment segregation unit 102 and external equipment segregation unit 14 may include at least one vent, for example the vent 43 or a ventilated panel or door. A ventilated panel or door may allow for gasses to pass from the internal equipment segregation unit 102 and the external equipment segregation unit 14, and may also allow for better cooling of the contents of the respective equipment segregation units.

As discussed with reference to FIGS. 1-21, the internal equipment segregation unit 102, external equipment segregation unit 14 and the zone enclosure unit 12 are each adapted to contain and separate electrical equipment. The equipment segregation unit 102 allows a first set of electrical equipment within the internal equipment segregation unit 102 to be separated from a second set of electrical equipment within the zone enclosure unit 12, to be separated from a third set of electrical equipment within the external equipment segregation unit 14.

Utilizing both an external equipment segregation unit 14 and an internal equipment segregation unit 102 allows for separation of three sets of electrical equipment. For instance, it is contemplated that certain electrical equipment may operate at a voltage above a threshold that is required for a licensed electrician. It is contemplated that such electrical equipment may be contained within the external equipment segregation unit 14. Also, the external equipment segregation unit 14 may be utilized to contain electrical equipment that, in certain applications, requires venting, such as a battery or a universal power supply. Safety may be improved by locating equipment that needs venting in the external equipment segregation unit 14 to reduce gas buildup within the zone enclosure unit 12.

Further, it is contemplated that certain equipment that is susceptible to EMI may be placed within the internal equipment segregation unit 102 that has been adapted to shield electrical equipment within the internal equipment segregation unit 102 from electromagnetic interference.

As discussed above, it is also contemplated the electrical equipment may be separated by the type of electrical equipment. For example, the electrical equipment housed within the external equipment segregation unit 14 may be used to provide power to the electrical equipment in the internal equipment segregation unit 102 and the electrical equipment in the zone enclosure unit 12.

It is additionally contemplated that the equipment segregation unit 102 and the zone enclosure unit 12 may separate equipment according to heat generation. Equipment that generates a significant amount of heat may be placed in the external equipment segregation unit 14 while equipment that generates less heat may be placed within the internal equipment segregation unit 102 or the zone enclosure unit 12.

The external equipment segregation unit 14 may be vented and the heat directed away from the electrical equipment within the zone enclosure unit 12 and the internal equipment segregation unit 102. Such venting can improve the operating environment of the equipment as the temperature within the zone enclosure unit 12 may remain lower.

While the particular preferred embodiments of the present invention have been shown and described, those skilled in the art will understand that changes and modifications may be made without departing from the teaching of the invention. The foregoing description and accompanying drawings are offered by way of illustration only and not as a limitation.

The invention claimed is:

1. An industrial control panel comprising:
a zone enclosure unit having a back panel, a plurality of side panels, a top panel, a bottom panel, and a door to access the interior of the zone enclosure unit, the zone enclosure unit adapted to contain a first set of electrical equipment;
an equipment segregation unit mounted to an outer surface of one of the panels of the zone enclosure unit, the equipment segregation unit having an equipment standoff bracket, an equipment mounting bracket, a back panel, a plurality of side panels, a bottom panel, and a door to access the interior of the equipment segregation unit, the equipment segregation unit adapted to contain a second set of electrical equipment;
a vapor resistant gasket between the interior of the zone enclosure unit and the interior of the equipment segregation unit;
a gland plate;
wherein the gland plate is proximally located to both the zone enclosure unit and the equipment segregation unit;
wherein the equipment segregation unit is readily removable from the zone enclosure unit; and
wherein the first set of electrical equipment is capable of being electrically connected to the second set of electrical equipment.

2. The industrial control panel of claim 1, wherein the first set of electrical equipment is adapted to receive power from the second set of electrical equipment.

3. The industrial control panel of claim 1, wherein the second set of electrical equipment is designed to operate at a voltage above about 42.2 volts.

4. The industrial control panel of claim 1 wherein the first set of electrical equipment is designed to operate at a voltage below about 42.2 volts.

5. The industrial control panel of claim 1, wherein the equipment segregation unit includes a moisture resistant gasket between the interior of the equipment segregation unit and the interior of the zone enclosure unit.

6. The industrial control panel of claim 1, further comprising a second equipment segregation unit mounted to the zone enclosure unit, the second equipment segregation unit having a back panel, a plurality of side panels, a bottom panel, and a door to access the interior of the second equipment segregation unit.

7. The industrial control panel of claim 1, wherein the equipment segregation unit includes a vent.

8. The industrial control panel of claim 1, wherein the door of the zone enclosure unit contains a lock to secure the door of the zone enclosure unit in a closed position and the door of the equipment segregation unit contains a lock to secure the door of the equipment segregation unit in a closed position.

9. An industrial control panel comprising:
a zone enclosure unit having a back panel, a plurality of side panels, a top panel, a bottom panel, and a door to access the interior of the zone enclosure unit, the zone enclosure unit adapted to contain a first set of electrical equipment;
an equipment segregation unit mounted to an inner surface of one of the panels of the zone enclosure unit, the equipment segregation unit having, an internal power base, a back panel, a plurality of side panels, a top panel, and a door to access the interior of the equipment segregation unit, the equipment segregation unit adapted to contain a second set of electrical equipment;
a vapor resistant gasket between the interior of the zone enclosure unit and the interior of the equipment segregation unit;
a gland plate;
wherein the gland plate is proximally located to both the zone enclosure unit and the equipment segregation unit;
wherein the equipment segregation unit is readily removable from the zone enclosure unit; and
wherein the first set of electrical equipment is capable of being electrically connected to the second set of electrical equipment.

10. The system of claim 9, wherein the equipment segregation unit includes a vent.

11. The system of claim 9, wherein the second set of electrical equipment is designed to operate at a voltage above about 42.2 volts.

12. An industrial control panel comprising:
a zone enclosure unit having a back panel, a plurality of side panels, a top panel, a bottom panel, and a door to access an interior of the zone enclosure unit, the zone enclosure unit adapted to contain a first set of electrical equipment;
an equipment segregation unit having an equipment mounting bracket, an equipment standoff bracket, a back panel, a plurality of side panels, a bottom panel, and a door to access an interior of the equipment segregation unit, the equipment segregation unit mounted to an outer surface of a panel of the zone enclosure unit, the equipment segregation unit adapted to contain a second set of electrical equipment, wherein the second set of electrical equipment includes at least one of a battery and a universal power supply;
wherein the equipment segregation unit is adapted to shield electrical equipment from electromagnetic interference;
wherein the equipment segregation unit is readily removable from the zone enclosure unit;
a vapor resistant gasket between the interior of the zone enclosure unit and the interior of the equipment segregation unit; and
a gland plate;
wherein the gland plate is proximally located to both the zone enclosure unit and the equipment segregation unit; and
wherein the first set of electrical equipment is adapted to receive power from the second set of electrical equipment;
a second equipment segregation unit mounted to an inner surface of a panel of the zone enclosure unit, the second equipment segregation unit having an internal power base, a back panel, a plurality of side panels, a top panel, and a door to access the interior of the second equipment segregation unit.

13. The industrial control panel of claim 12, wherein the equipment segregation unit and the second equipment segregation unit are mounted to the same panel of the zone enclosure unit.

14. The industrial control panel of claim6, wherein the second equipment segregation unit is adapted to shield electrical equipment from electromagnetic interference.

15. The system of claim 9, wherein the equipment segregation unit is adapted to shield electrical equipment from electromagnetic interference.

\* \* \* \* \*